(12) United States Patent
Kadi et al.

(10) Patent No.: US 9,560,510 B2
(45) Date of Patent: *Jan. 31, 2017

(54) REDUCING PROVIDER COSTS RELATED TO E911 SERVICE

(71) Applicant: AT&T INTELLECTUAL PROPERTY I, L.P., Atlanta, GA (US)

(72) Inventors: Sergio Kadi, Panama City Beach, FL (US); Jing Chen, Alpharetta, GA (US); Feza Buyukdura, Fairview, TX (US); Dwayne Crawford, Indianapolis, IN (US); Stephanie Parlamas, Colts Neck, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/140,686

(22) Filed: Apr. 28, 2016

(65) Prior Publication Data
US 2016/0242017 A1    Aug. 18, 2016

Related U.S. Application Data

(63) Continuation of application No. 14/323,060, filed on Jul. 3, 2014, now Pat. No. 9,357,369.

(51) Int. Cl.
*H04W 4/22* (2009.01)
*H04W 4/02* (2009.01)
(Continued)

(52) U.S. Cl.
CPC .......... *H04W 4/22* (2013.01); *G06F 17/30345* (2013.01); *G06F 17/30424* (2013.01);
(Continued)

(58) Field of Classification Search
CPC ...... H04W 76/007; H04W 4/22; H04M 11/04; G06B 25/016; G08B 25/016
(Continued)

(56) References Cited

U.S. PATENT DOCUMENTS

| 6,990,328 B2 * | 1/2006 | Crandall | H04W 76/007 379/37 |
| 7,379,729 B2 * | 5/2008 | Holland | G01S 5/0027 342/357.29 |

(Continued)

FOREIGN PATENT DOCUMENTS

WO    2006039783    4/2006

OTHER PUBLICATIONS

"Find Me 911: A coalition to ensure that 911 works in today's wireless age.," findme911.orghttp://findme911.org/. Retrieved on Apr. 14, 2014, 1 page.
(Continued)

*Primary Examiner* — Christopher M Brandt
(74) *Attorney, Agent, or Firm* — Amin, Turocy & Watson, LLP

(57) ABSTRACT

In compliance with regulatory requirements imposed on multicarrier wired/wireless network carriers, the disclosed system receives input representing a selection of a street address to be used as a current location associated with a user identity. The system determines an expiration date associated with the street address, designates the street address as a validated emergency contact location for the user identity in response to determining that the expiration date associated with the street address has not expired. The system thereafter permits the establishment of communications between the system and a disparate wireless network device associated with a multicarrier wireless network.

20 Claims, 13 Drawing Sheets

(51) Int. Cl.
*H04M 1/725* (2006.01)
*G06F 17/30* (2006.01)

(52) U.S. Cl.
CPC ... *H04M 1/72536* (2013.01); *H04M 1/72572* (2013.01); *H04W 4/028* (2013.01)

(58) Field of Classification Search
USPC .............. 455/404.1, 404.2, 412.1, 414.2, 456.1, 455/456.3, 457; 379/45
See application file for complete search history.

(56) References Cited

U.S. PATENT DOCUMENTS

| | | | | | |
|---|---|---|---|---|---|
| 7,653,374 | B2* | 1/2010 | Mehio | ............... | H04M 7/0057 370/352 |
| 7,856,007 | B2* | 12/2010 | Corcoran | ............... | H04B 3/542 340/12.32 |
| RE42,285 | E* | 4/2011 | Anderson | ............... | G01S 5/02 342/457 |
| 8,289,953 | B2* | 10/2012 | Ray | ............... | H04L 45/306 370/352 |
| 8,364,117 | B2* | 1/2013 | Hawkins | ............... | H04M 3/5116 455/404.1 |
| 8,396,445 | B2* | 3/2013 | Crawford | ............... | H04L 45/00 379/37 |
| 8,407,773 | B1* | 3/2013 | Hayter | ............... | H04L 67/16 726/7 |
| 8,442,481 | B2* | 5/2013 | Maier | ............... | H04W 64/00 455/404.1 |
| 8,447,267 | B2* | 5/2013 | Ray | ............... | H04M 3/5116 370/328 |
| 8,484,352 | B2* | 7/2013 | Piett | ............... | H04W 4/22 709/223 |
| 8,531,995 | B2* | 9/2013 | Khan | ............... | H04L 12/66 370/271 |
| 8,620,257 | B2* | 12/2013 | Qiu | ............... | H04M 1/2535 379/207.12 |
| 8,929,912 | B1* | 1/2015 | Chitre | ............... | G08B 25/016 455/456.1 |
| 2005/0081045 | A1* | 4/2005 | Nicodemus | ............... | H04L 9/3271 713/182 |
| 2005/0090225 | A1* | 4/2005 | Muehleisen | ............... | H04M 11/045 455/404.1 |
| 2006/0068753 | A1* | 3/2006 | Karpen | ............... | H04M 3/42 455/404.2 |
| 2006/0293024 | A1* | 12/2006 | Benco | ............... | H04M 7/006 455/404.2 |
| 2007/0160036 | A1* | 7/2007 | Smith | ............... | H04L 29/06027 370/356 |
| 2008/0063153 | A1* | 3/2008 | Krivorot | ............... | H04M 3/42348 379/45 |
| 2008/0222696 | A1 | 9/2008 | Nicodemus et al. | | |
| 2010/0184401 | A1* | 7/2010 | Spence | ............... | G01S 19/39 455/404.2 |
| 2011/0026687 | A1* | 2/2011 | Smelyansky | ............... | H04W 76/007 379/45 |
| 2012/0082091 | A1* | 4/2012 | Siomina | ............... | H04W 4/02 370/328 |
| 2013/0148549 | A1 | 6/2013 | Crawford et al. | | |
| 2013/0244611 | A1* | 9/2013 | Singhal | ............... | H04W 4/04 455/404.2 |

OTHER PUBLICATIONS

"Voip-Info.org: A reference guide to all things," voip-info.org http://www.voip-info.org/wiki/view/e911. Retrieved on Apr. 14, 2014, 3 pages.

Johnson, "E911 services primer: Wireless and VoIP phones in emergency situations," TechTarget, Search Mobile Computing. http://searchunifiedcommunications.techtarget.com/feature/E911-services-primer-Wirelessand-VoIP-phones-in-emergency-situations. Retrieved on Apr. 14, 2014, 5 pages.

"The E911 Expers, Feature Brief: Automatic IP Phone Tracking," 911 Enable, Division of Connexon Telecom Inc., QC Canada, http://www1.911enable.com/documents/pdf/phone_discovery_feature_brief_pdf. Retrieved on Apr. 14, 2014, 4 pages.

"Softphone 911 service," Videotron .com http://support.videotron.com/residential/telephony/softphone/911-service. Retrieved on Apr. 14, 2014, 2 pages.

Non-Final Office Action for U.S. Appl. No. 14/323,060 dated Jul. 29, 2015, 32 pages.

* cited by examiner

US 9,560,510 B2

REDUCING PROVIDER COSTS RELATED TO E911 SERVICE

RELATED APPLICATION

The present application is a continuation of U.S. patent application Ser. No. 14/323,060, (now U.S. Pat. No. 9,357, 369), filed Jul. 3, 2014, and entitled "REDUCING PROVIDER COSTS RELATED TO E911 SERVICE," the entire content of which application is hereby incorporated herein by reference.

TECHNICAL FIELD

The disclosed subject matter relates to reducing costs, e.g., monthly costs, paid to entities tasked with routing telephonic calls for purposes of emergency response (e.g., National Emergency Number Association (NENA) i2 providers) in relation to the provision of emergency services, such as enhanced 911 services.

BACKGROUND

In order to comply with the legal and regulatory requirements underpinning an enhanced emergency response system, when a call (e.g., dialing an emergency response number, such as: 911 in the United States and Canada, 112 in most countries that form the European Union, . . . ) is placed using a current telecommunications device (e.g. landline telephone, cellular telephone, smart phone, etc.), via a public switched telephone network and/or its radio access network extensions, to a public safety answering point (PSAP) for the dispatch of public safety response resources or services (e.g., police services, medical/ambulance services, fire service, etc.), the street address (e.g., postal or civic address) from where the call is being initiated is typically automatically provided and displayed to personnel associated with the public safety answering point so that public safety response personnel, resources, and/or services can be efficiently and expeditiously sent to the correct location.

DETAILED DESCRIPTION

Figure 1:
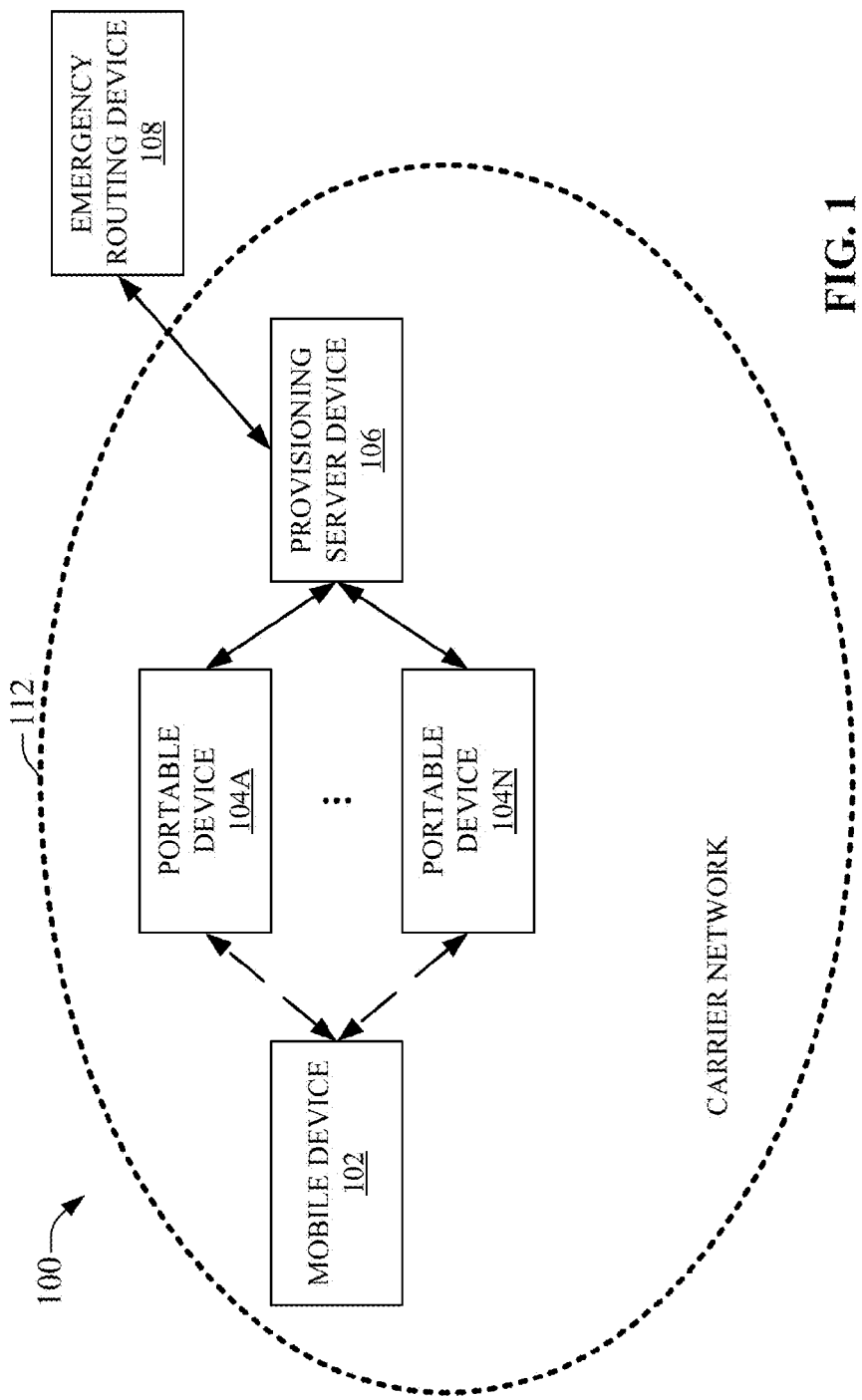
FIG. 1 is an illustration of a system for reducing the quantum of periodic payments disbursed to entities tasked with routing telephonic calls for purposes of emergency response in relation to the provision of enhanced 911 services in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

In accordance with an embodiment, the subject disclosure describes a system or device comprising a processor, and a memory that stores executable instructions that, when executed by the processor, facilitate performance of operations. The operations can include receiving input representing a selection of a street address for a current location associated with a user identity, as a function of the input, determining an expiration date associated with a generated key (e.g., enhanced 911 address identifier) that can be associated with the street address, designating the street address as an emergency contact location for the user identity in response to determining the expiration date associated with the street address has not expired, and permitting establishment of a communication between the device and a wireless network device associated with a multicarrier wireless network.

Additional operations that can be performed by the system or device can also include: in response to determining that the expiration date associated with the street address has expired, initiating sending of a request for address data representing the street address to a provisioning server device coupled to a data storage device.

In accordance with a further embodiment, the subject disclosure describes a method, comprising a series of acts that can include receiving, by a system comprising a processor, street address validation data representing a street address validation request, determining that a street address included in the street address validation request has an entry representing the street address in a data storage device associated with the system as a function of determining that the street address has previously been entered in the data storage device, updating an expiration date associated with the street address, and returning updated data representing the expiration date and an enhanced 911 address identifier.

Additional acts can include adding a defined periodicity to a current date to result in the expiration date associated with the street address, determining that the street address has not previously been entered in the data storage device, generating the enhanced 911 address identifier, and initiating sending of verification data representing the enhanced 911 address identifier and the street address to an emergency routing device, and more particularly to databases associated with the emergency routing device. Further acts include receiving notification data representing a notification from the emergency routing device that the street address included in the verification data cannot be correlated with a geographical coordinate, and initiating sending of the notification to a portable device to facilitate re-entry of the street address.

Still additional acts can include storing storage data representing the enhanced 911 address identifier, the street address, and a determined expiration date to the data storage device as an entry, and periodically scanning the data storage device for entries associated with enhanced 911 address identifiers that have expired as a function of a current date, initiating sending of removal request data representing the entries that have expired to an emergency routing device to facilitate removal of the entries from a data store device associated with the emergency routing device, and in response to a confirmation data representing a notification that the emergency routing device has removed the entries from the data store device associated with the emergency routing device, deleting the entries from the data storage device as a function of the removal request data.

In accordance with a still further embodiment, the subject disclosure describes a computer readable storage device comprising instructions that, in response to execution, cause a computing system comprising a processor to perform operations. The operations can include preventing establishment of a communication to a network device associated with a multicarrier wireless network, receiving input representing a street address for a current location associated with a user identity, determining an expiration date associated with the street address, designating the street address as an emergency contact location for the user identity in response to determining that the expiration date has not lapsed due to an effluxion or a passage of time, and permitting the establishment of the communication to the network device associated with the multicarrier wireless network.

Additional operations can include in response to determining that the expiration date has lapsed due to the effluxion or passage of time, initiating sending of address data representing the street address to a provisioning server device coupled to a data storage device, and where the input is initial input and in response to receiving further input representing an alternate street address for the current location associated with the user identity, initiating sending of alternative address data representing the alternative street address to a provisioning server device coupled to a data storage device, wherein the alternative street address is to be used as the emergency contact location.

Further operations can also include receiving validated street address data from the provisioning server device, wherein the validated street address data comprise an expiration date and an enhanced 911 address identifier generated by the provisioning server device.

In order to facilitate the foregoing, an enhanced emergency response system can include an emergency routing device (with associated databases) that can operate in a manner consistent with guidelines mandated by a governmental regulatory body, such as the Federal Communications Commission (FCC). Illustrative functionalities that can be performed by the emergency routing device can include routing calls requesting public safety response resources to a public safety answering point proximate to the street address from where the call is being initiated. Additionally, the emergency routing device can also supply, to the appropriate, proximate, and/or nearby public safety response answering point, the street address from where the call has been initiated. Nonetheless, in return for providing this service, the organization/entity (e.g., a for-profit or a non-profit business organization/entity) that controls provision of the emergency 911 routing service typically charges a small periodically (e.g., daily, monthly, quarterly, semi-annually, etc.) incurred service fee for persisting or storing associating records that associate the communication device (e.g., to date: landline telephone, smart phone, cellular phone, wireless communication endpoint, user equipment, etc.) with a current street address. While this service fee maybe nominal, with the advent of portable devices (e.g., tablet computers, laptop computers, notebook computers, personal digital assistants (PDAs), and like) being provided with communication clients operable on these portable devices (e.g., services that allow users to communicate with their peers via voice using a microphone, video by using a webcam (e.g., a video camera that feeds or streams its images in real time to or through a computer or computer network), and instant messaging (e.g., real-time text transmission) over the Internet), and the fact that a single mobile device (e.g., cell phone, smart phone, user equipment (UE), communication endpoint, etc.) can be associated with a plurality of portable devices (e.g., tablet computers, laptop computers, notebook computers, and the like), wherein each of the portable devices can be tied to or affiliated with the mobile device through a unique telephone number/subscriber number/public user identifier (PUID) provided by a carrier that supplies services associated with public switched telephone networks and/or their radio access network extensions, the costs incurred by the carrier can be substantial should each and every street address, irrespective of whether or not the street address is valid and/or reflective of a current reality for each tied or associated portable device, be stored to the emergency routing device and its affiliated databases.

Now with reference to the Figures. FIG. 1 illustrates a system 100 for reducing the quantum of periodic payments disbursed to entities tasked with routing telephonic calls for purposes of emergency response (e.g., i2 providers) in relation to the provision of enhanced 911 services. System 100 can include mobile device 102, one or more portable devices 104A . . . 104N (e.g., where A is an integer equal to or greater than zero and N is an integer greater than A), provisioning server device 106, and emergency routing device 108, wherein mobile device 102, the one or more portable devices 104A . . . 104N, and provisioning server device 106 are included within the ambit of a single carrier network 112 (e.g., a provider/carrier of telecommunication services, such as mobile telephone, fixed telephone, and/or broadband subscription services). It will be observed that emergency routing device 108, solely for purposes of ease of exposition, has been depicted as being situated outside the scope of the single carrier network 112, since emergency routing device 108, for purposes of this disclosure, is to be envisioned as a beneficial resource available and/or to be utilized by all carriers or providers of telecommunication services irrespective of commercial allegiance.

As depicted, mobile device 102 can be a cellular telephone device, a smart phone device, and the like, that has been assigned a unique subscriber number or public user identifier (PUID) by a provider of mobile telephone, fixed telephone, and/or broadband subscription services.

Portable device 104A . . . portable device 104N can be any device comprising at least one processor capable of executing instructions that facilitate performance of operations. Portable device 104A . . . portable device 104N may comprise a device that does not ordinarily or typically include functionalities or capabilities for ascertaining or determining, on its own volition, its location, for example, through use of facilities provided by space-based satellite navigation systems that provide location and time information in all weather conditions, anywhere on or near the Earth where there is an unobstructed line of sight to four or more global positioning system (GPS) satellites. Example portable devices (104A . . . 104N) can therefore include any of a tablet computing device, personal digital assistant (PDA) device, laptop computer device, notebook computer device, portable consumer and/or industrial electronic equipment/ devices, and the like. It should be noted at this juncture, solely for ease of exposition, that from here on portable device 104A . . . portable device 104 will collectively be referred to as portable device 104. It should further be noted, also for purposes of simplicity of exposition, that while a functional distinction has been made between mobile device 102 and portable device 104, those of ordinary skill will appreciate the functionalities and facilities described herein can find equal and interchangeable applicability on both mobile devices (e.g., mobile device 102) as well as portable devices (e.g., portable device 104).

Portable device 104, in addition to other capabilities, facilities, and/or functionalities that can be resident and/or operational on portable device 104, such as calendaring, games, interfaces (e.g., browser interfaces, instant messaging interfaces, etc.), can also provide a communication client that permits users of the portable device 104 to communicate with their peers through the public switched telephone network and/or its radio access network extensions. Concomitant with this capability of providing communication via the public switched telephone network and its radio access network extensions through an executing or operational communication client, however, there is a regulatory requirement imposed on providers/carriers of public switched telephone networks and/or their radio access network extensions (e.g., telecommunications carrier networks) to provide a validated current location associated with the portable device 104 so that, if emergency response resources are ever necessary, these emergency response resources can be dispatched and directed to the validated current location as expeditiously as possible should the communication client operational on portable device 104 be employed by the user to solicit emergency or public safety response resources as required by regulatory guidelines, for example.

In accordance with an embodiment therefor, when a communication client operational and/or executing on portable device 104 starts up, commences operation, and/or during first initialization and/or subsequent initializations and/or start ups, the communication client can prompt a user to select one of a previously used street address or enter a new street address for their current location. In the case where the user selects a previously used street address, the communication client can check data storage facilities associated with portable device 104 to determine whether or not the previously used street address has been associated with an enhanced 911 address identifier (E911AID) (e.g., an identifier, as described below, that is generated by provisioning server device 106), wherein the enhanced 911 address identifier in turn has been associated with an expiration date—the expiration date is also generated and supplied by provisioning server device 106.

In the case where the communication client determines that the expiration date associated with the enhanced 911 address identifier has not expired, the communication client can use the selected (previously used) street address as a validated current address should the user dial an emergence response number (e.g., 911, 999, 122, etc.) for purposes of beckoning emergency or public safety response personnel, resources, or services to the current location/address in a case of an emergency.

In instances where the communication client determines that the expiration date associated with the enhanced 911 address identifier has lapsed through the effluxion of time, or where the user has entered a new street address to be used as a current location/address, the communication client can send a street address validation request to provisioning server device 106.

Provisioning server device 106, as will be further described below, in response to receiving the street address validation request, checks its own associated databases and/or data stores to determine whether or not the street address included in the street address validation request from portable device 104 appears in the associated databases and/or data stores. In instances where provisioning server device 106 locates the submitted street address in its storage facilities, it can update the expiration date and return the associated enhanced 911 address identifier and the updated expiration date to portable device 104 (e.g., to the communication client operating on portable device 104 that initiated dispatch of the street address validation request). In order to provide an updated expiration date provisioning server device 106 for example can utilize the current date and add a defined periodicity (e.g., one or more hour, one or more days, one or more month, etc.) to the current date, such as: "current date+23 hours"; "current date+5 days"; "current date+28 days"; or "current date+180 days", wherein "23 hours", "5 days", "28 days", "180 days" can be the defined periodicity. It should be noted in this regard, and as will be explained subsequently, since charges are incurred as a function of the number of records stored to databases or data storage means associated with emergency routing device 108 in a defined period of time, the defined periodicity is typically set to ensure that those records containing street addresses that have not been accessed within the defined periodicity become obsolete and are removed from the respective databases/data storage devices associated with the provisioning server device 106 and the emergency routing device 108 in order to minimize payments due to the business entity that controls emergency routing device 108 for the storage or records or entries that have not been utilized within the defined periodicity. It should also be noted that the defined periodicity and the defined period of time (e.g., when payment is due to the organization that controls or operates emergency routing device 108) are not necessary equal and typically it can be assumed that the defined periodicity generally does not exceed the defined period of time. Thus, in the examples provided above, it can be assumed that where the defined periodicity was set to "23 hours", "5 days", "28 days", and "180 days", the defined period of time (e.g., payment was due to the entity controlling or operating emergency routing device 108) was set to "24 hours", "6 days", "29 days", and "181 days", for example.

In instances where provisioning server device 106 is unable to locate, in associated databases and/or data stores, the street address included in the street address validation request received from portable device 104, provisioning server device 106 can generate an enhanced 911 address identifier, and include this generated enhanced 911 address identifier in a validation request that can be sent to emergency routing device 108.

In response to the validation request received from provisioning server device 106, emergency routing device 108 can check the validity of the street address associated with the enhanced 911 address identifier and included in the validation request. Emergency routing device 108 can check the validity of the street address against a master street address guide (MSAG) that typically can be used by the emergency routing device 108 to map the submitted street address to a public safety answering point (PSAP). The master street address guide is typically persisted to databases and/or data storage devices associated with emergency routing device 108. The validity check of the street address against the master street address guide ensures that the submitted street address can be geocoded.

Where emergency routing device 108 is able to correlate the submitted street address with a relevant geocode based on, or as a function of, the master street address guide, emergency routing device 108 can associate the identified geocode with the submitted street address and the enhanced 911 address identifier (e.g., the enhanced 911 address identifier is generated by provisioning server device 106 and is sent to the emergency routing device 108 in a validation request), store this associated record (e.g., the street address, geolocation code, enhanced 911 address identifier, and/or proximate public safety answering point (PSAP)) to one or more data storage devices or databases associated with emergency routing device 108, and thereafter can return notification or acknowledgment (ACK) to provisioning server device 106 that it was able to validate the street address, correlate the street address with a relevant and recognized geolocation code, and persist the resulting record as an entry in its databases or data storage devices.

Upon receipt of the notification or acknowledgement from emergency routing device 108, provisioning server device 106 can store the user provided street address (e.g., the street address that was submitted by the communication client executing on portable device 104) as a validated current street location/address to its databases and data storage devices, associate the previously generated enhanced 911 address identifier (and the determined expiration date) with the validated current location/address, and send the generated enhanced 911 address identifier and the determined expiration date to the communication client operating on portable device 104. At this juncture the communication client operational and executing on portable device 104 can allow a user to establish calls to and to receive calls from one or more devices associated with telecommunications carrier networks or multicarrier wireless networks.

In instances where emergency routing device 108 is unable to correlate the submitted street address with a relevant geocode based on, or as a function of, the master street address guide, emergency routing device 108 can send notification (e.g., a negative acknowledgement (NACK)) to provisioning server device 106, whereupon provisioning server device 106 can forward the negative acknowledgement to the communication client executing on portable device 104. On receiving the negative acknowledgement from provisioning server device 106, communication client can facilitate display of an error message on a display device associated with portable device 104, wherein the error message can prompt a user of portable device 104 to enter another (correct) street address.

In accordance with the foregoing, provisioning server device 106 can therefore be in continuous and/or intermittent communication with portable device 104 and/or emergency routing device 108. Provisioning server device 106 can be a device that comprises at least one processor, a memory that stores executable (e.g., machine or computer) instructions that, when executed by the at least one processor, facilitate performance of operations, and a plethora of storage devices, such as associated databases and/or data stores for long-term storage of data and/or computer/machine executable instructions.

As noted above, provisioning server device 106, in an embodiment, can be configured to receive a street address validation request from a communication client resident and executing on portable device 104 and generate a unique enhanced 911 address identifier (E911AID), wherein the unique E911AID is generated as a function of the street address contained or included in the street address validation request received from the portable device 104. Provisioning server device 106, based at least in part on, in response to, and/or as a function of the received street address validation request comprising at least the current street address, can also send a query to an emergency routing device 108 for validation of the submitted street address; create, associate, and maintain an expiration date for the E911AID; store the validated E911AID/street address pairs in an associated database or data store; and thereafter send/return the validated E911AID/street address couplet/pair data to the communication client operational or executing on portable device 104 that initiated the street address validation request.

Additionally, provisioning server device 106, in response to an indication from the emergency routing device 108 that a street address included in a submitted or forwarded street address validation request received from the portable device 104 has not been validated or is unverifiable, can return an indication or notification to the communication client operational on portable device 104 that the street address contained the previously sent validation request has not been validated or cannot be verified by the emergency routing device 108, and that a valid street address needs to be reentered by the user into the communication client. It should be noted that until the foregoing street address validation sequence has concluded or has been resolved successfully with a valid and/or verified street address and an associated enhanced 911 address identifier with an expiration date being sent to the communication client executing on portable device 104, the communication client can, be blocked from being able to contact other wired and/or wireless devices extant on multicarrier wired and/or wireless networks.

Additional functionalities and/or facilities that can be performed by provisioning server device 106 can include, based on, in response to, and/or as a function of receiving from a communication client executing and operating on a portable device 104 a street address validation request that includes a current street address entered into the communication client, determining or checking whether or not the entered current street address included in the street address validation request has already been persisted to data stores and/or databases associated with provisioning server device 106. In response to, based on, and/or as a function of, determining that the street address appears in the data stores and/or databases associated with provisioning server device 106, provisioning server device 106 can update an expiration date that is typically associated with the current street address, and then can return a generated index key (e.g., an enhanced 911 address identifier (E911AID) that can be utilized to rapidly search through one or more relevant and disparate databases) together with the expiration date to the communication client operational and executing on portable device 104.

Conversely, in response to, based on, and/or as a function of provisioning server device 106 not finding, locating, or identifying, in databases or data stores associated with provisioning server device 106, the street address included in the street address validation request received from a communication client operational or executing on a portable device 104, provisioning server device 106 can generate an enhanced 911 address identifier (E911AID) which then can be utilized by provisioning server device 106 to communicate with and to send a validation request (including the generated enhanced 911 address identifier) to emergency routing device 108.

In response to the validation request sent to emergency routing device 108, provisioning server device 106 can receive notification that emergency routing device 108 was able to assign a geocode (e.g., provide geo-location coordinates) to the street address associated with the enhanced 911 address identifier, and that the emergency routing device 108 was able to store the enhanced 911 address identifier to one or more databases or data stores associated with emergency routing device 108. In response to receiving notification that emergency routing device 108 was able to assign a geocode and was also able to store the enhanced 911 address identifier, provisioning server device 106 can store the street address, the enhanced 911 address identifier (and generated expiration date) to databases associated with provisioning server device 106, and can thereafter send the enhanced 911 address identifier (and the expiration date) to the initiating communication client executing on portable device 104.

In instances where emergency routing device 108 is unable to assign a valid geocode to the street address associated with and included in the enhanced 911 address identifier, provisioning server device 106 can receive notification that emergency routing device 108 was unable to assign a valid geocode. On receipt of this notification, provisioning server device 106 can send the failure response to the initiating communication client operational and executing on portable device 104. At this point, the communication client executing on portable device 104 can display an error message to the user, and can prompt the user to enter another (correct) street address to be utilized as a current address/location of the portable device 104.

Other functionalities and facilities provided by provisioning server device 106 can include, on a periodic basis (e.g., daily), scanning databases or data stores associated with provisioning server device 106 for expired enhanced 911 address identifiers. Subsequent to the scanning, in response to provisioning server device 106 identifying expired/obsolete enhanced 911 address identifiers, provisioning server device 106 can communicate with emergency routing device 108 to ensure that these obsolete records are removed from the databases and/or data stores associated with the emergency routing device 108. Once emergency routing device 108 has completed deletion or removal from its databases and/or associated data stores of obsolete and expired enhanced 911 address identifiers, provisioning server device 106 can receive a confirmation response from the emergency routing device 108, at which point provisioning server device 106 can remove street address entries associated with expired and/or obsolete enhanced 911 address identifiers from its associated databases and/or affiliated data stores.

Further activities that can be carried out by provisioning server device 106 can also include on a periodic basis (e.g., daily) receiving, from a communication client operational on portable device 104, a request for the renewal or extension the expiration date associated with the enhanced 911 address identifier and the currently valid street address. The request for renewal or extension of the expiration date can be initiated, by the communication client executing on portable device 104, when the communication client determines that the expiration date associated with a hitherto and currently valid street address and the enhanced 911 address identifier will lapse within a defined or definable period of time (e.g., one hour, two hours, six hours, twelve hours, twenty four hours, thirty six hours, forty eight hours, . . . ). The communication client in response to determining that the expiration date is imminently about to elapse, can send a request to provisioning server device 106 to have provisioning server device 106 perform the acts described above to extend the expiration period.

Also illustrated in FIG. 1 is emergency routing device 108 that can be in constant, continuous, intermittent, and/or sporadic communication with provisioning server device 106 as well as with the wider public switched telephone network and its radio access network extensions. Emergency routing device 108 can also be in constant, continuous, intermittent, and/or sporadic communication with a multiplicity various public safety answering points through which public safety response resources can be allocated and dispatched when various emergency situations arise. As has been intimated above, emergency routing device 108, when a call for public safety response resources is initiated by a user through the public switched telephone network and/or by functionalities and/or facilities provided by an associated radio access network, can route the call to a public safety answering point in close proximity to the location from where the call was or is being initiated.

Additional activities that can be performed by emergency routing device 108 can be consonant with those functionalities required by guidelines promulgated by regulatory bodies, such as the Federal Communications Commission. Illustrative activities can include receiving validation requests (inclusive of street address and generated and associated enhanced 911 address identifier) from provisioning server device 106. On receipt of a validation request from provisioning server device 106, emergency routing device 108 can check databases and/or data storage units associated with emergency routing device 108 to determine whether a street address included in the received validation request appears in a master street address guide (MSAG)—database (s) that comprises geolocation coordinates associated with all known street addresses within a defined geographical area (e.g., country, state/province, prefecture, county, city/town, village, etc.) and as a function of, and/or based on, the geolocation coordinates, the public safety answering points that are proximate or are in the vicinity of the submitted street address.

Emergency routing device 108, when it determines that the submitted street address cannot be correlated, paired, or associated with geolocation coordinates included in the master street address guide, can return notifications to provisioning server device 106 that the submitted street address is invalid, unverifiable, or cannot be verified. Provisioning server device 106, as described above, can forward these invalidity notifications received from emergency routing device 108 to portable device 104 for further processing by the communication client executing on portable device 104.

In situations where emergency routing device 108 identifies geolocation coordinates that can be associated with the submitted street address and/or determines that the geolocation coordinates can be manually entered, emergency routing device 108 can store the enhanced 911 address identifier and the submitted street address to databases and/or data storage facilities associated with emergency routing device 108, and subsequent to, or contemporaneously with, the storage operation performed by emergency routing device 108, emergency routing device 108 can send a notification message to provisioning server device 106 confirming the fact that the submitted street address has been validated with appropriate geolocation coordinates (from the master street address guide), and that the validated street address in association with the determined geolocation coordinates, and the enhanced 911 address identifier (received earlier in the validation request from provisioning server device 106) has been persisted to databases or data storage facilities associated with emergency routing device 108.

Additional functionalities that can be undertaken and performed by emergency routing device 108, can include periodically (e.g., with a defined periodicity such as: hourly, daily, weekly, fortnightly, monthly, etc.) receiving, from provisioning server device 106, requests for the removal of expired entries from the databases associated with emergency routing device 108. As has been detailed earlier, provisioning server device 106 periodically scans its databases and/or data storage units (e.g., databases and/or data storage units associated with provisioning server device 106) for records associated with expired/obsolete enhanced 911 address identifiers and/or street addresses. Provisioning server device 106 can compile and submit a list of such expired and obsolete enhanced 911 address identifiers and/or street addresses to emergency routing device 108 requesting that emergency routing device 108 remove the expired entries or records from its databases and/or data storage facilities. Once emergency routing device 108 has completed removal of the expired entries or records included in the list of records submitted by provisioning server device 106 to emergency routing device 108, emergency routing device 108 can return to provisioning server device 106 a notification or message confirming that the expired records have been expunged from the databases and/or data storage units controlled and/or maintained by emergency routing device 108. As has been noted above, in response to receiving notification confirming removal of expired records from databases and data storage facilities maintained and controlled by emergency routing device 108, provisioning server device 106, as a function of the list that was sent to emergency routing device 108, can similarly expunge the expired records from databases and/or storage units controlled and maintained by provisioning server device 106.

Figure 2:
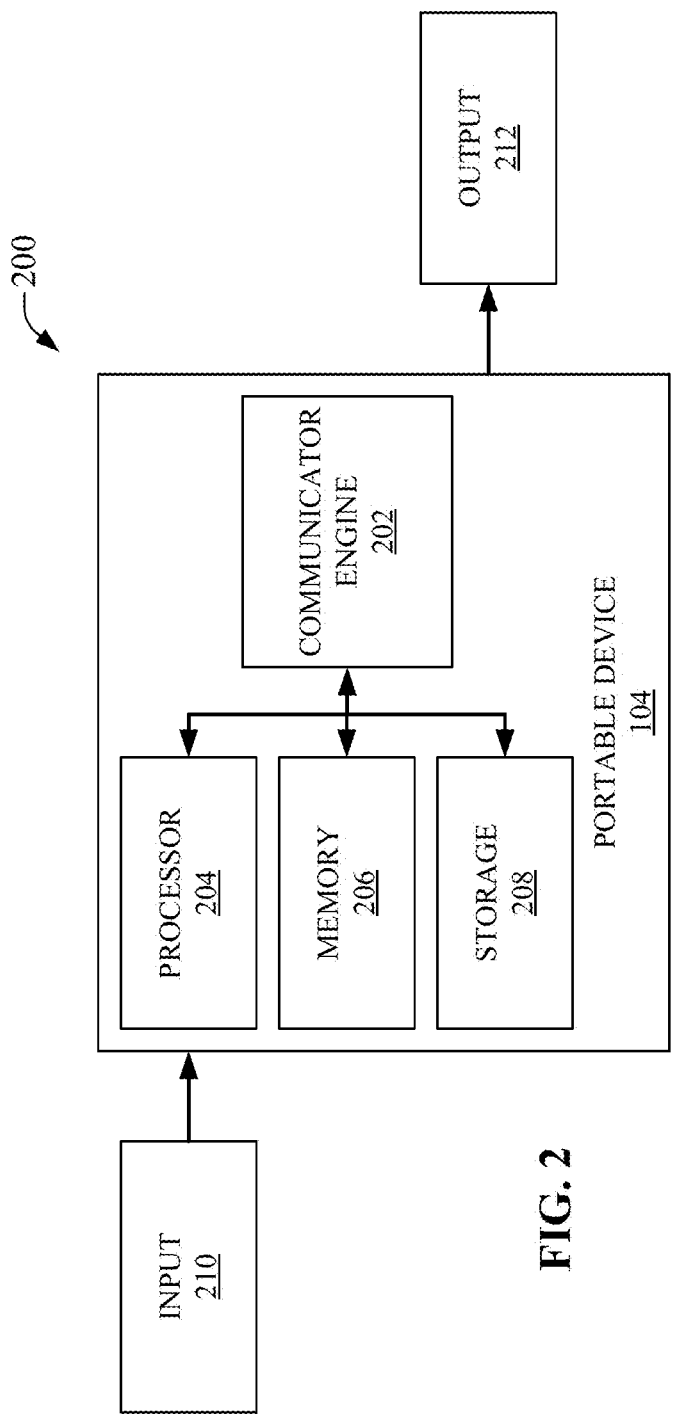
FIG. 2 is a further depiction of a system for reducing the quantum of periodic payments disbursed to entities tasked with routing telephonic calls for purposes of emergency response in relation to the provision of enhanced 911 services in accordance with aspects of the subject disclosure.

FIG. 2 provides further illustration 200 of portable device 104 in accordance with the subject application. As depicted portable device 104 can include communicator engine 202 that can be coupled to processor 204, memory 206, and storage 208. Communicator engine 202 can be in communication with processor 204 for facilitating operation of computer executable instructions and components by communicator engine 202, memory 206 for storing data and/or the computer executable instructions and components, and storage 208 for providing longer-term storage of data and/or computer executable instructions. Additionally, portable device 104 can also receive input 210 for use, manipulation, and/or transformation by communicator engine 202 to produce one or more useful, concrete, and tangible result and/or transform one or more article to different states or things. Further, portable device 104 can also generate and output the useful, concrete, and tangible result and/or the transformed one or more articles produced by communicator engine 202 as output 212.

Communicator engine 202 can facilitate operation of a communication client or portable device 104, wherein the communication client permits users of portable device 104 to communicate with their peers through the public switched telephone network and/or its radio access network extensions (e.g., one or more multicarrier wired and/or wireless communication networks). In conformance with legal and/or regulatory requirements imposed on providers/carriers of multicarrier wired and/or wireless communication networks to provide validated current locations associated with use of portable devices (e.g., portable device 104) that connect to multicarrier wired and/or wired communication networks), communicator engine 202, when a communication client operational and/or executing on portable device 104 starts up or commences operation can cause the communication client to prompt a user to select one of a previously used street address or enter a new street address for their current location.

In response to the user selecting a previously used street address, communicator engine 202 can check data storage facilities (e.g., memory 204 and/or storage 208) associated with portable device 104 to determine whether or not the previously used street address has been associated with an enhanced 911 address identifier generated by provisioning server device 106 and an expiration date also generated and supplied by provisioning server device 106.

In response to communicator engine 202 determining that the expiration date associated with the enhanced 911 address identifier has not expired, communicator engine 202 can use the selected (previously used) street address as a validated current address should the user dial an emergence response number (e.g., 911, 999, 122, etc.) for purposes of beckoning emergency or public safety response personnel, resources, or services to the current location/address in a case of an emergency.

In response to communicator engine 202 determining that the expiration date associated with the enhanced 911 address identifier has lapsed through the effluxion of time, or where the user has entered a new street address to be used as a current location/address, communicator engine 202 can send a street address validation request to provisioning server device 106 for further processing and await a response from provisioning server device 106.

Where provisioning server device 106, in response to receiving the street address validation request from communicator engine 202, locates the submitted street address in its storage facilities and updates the expiration date associated with a generated enhanced 911 address identifier, can respond to the street address validation request from communicator engine 202 with a generated enhanced 911 address identifier and an associated updated expiration date. As noted above, the updated expiration date can, for instance utilize the current calendar date and add a defined periodicity to the current date.

Where provisioning server device 106, in response to receiving the street address validation request from communicator engine 202 executing on portable device 104, is unable to locate, in associated databases and/or data stores, the street address included in the street address validation request received from communicator engine 202, can generate an enhanced 911 address identifier, and include this generated enhanced 911 address identifier in a validation request that can, as has been noted above, be sent to emergency routing device 108 for further processing and response.

In instances where emergency routing device 108 subsequent to checking the validity of the street address against a master street address guide (MSAG) and determining that the submitted street address can be correlated with a geocode based on, or as a function of, the master street address guide, emergency routing device 108 can associate the identified geocode with the submitted street address and the enhanced 911 address identifier, store this associated record (e.g., the street address, geolocation code, enhanced 911 address identifier, and/or proximate public safety answering point) to one or more data storage devices or databases associated with emergency routing device 108, and thereafter can return notification or acknowledgment (ACK) to provisioning server device 106 that it was able to validate the street address, correlate the street address with a relevant and recognized geolocation code, and persist the resulting record as an entry in its databases or data storage devices. When provisioning server device 106 receives such a response from emergency routing device 108 it can forward the previously generated enhanced 911 address identifier and the updated expiration back to communicator engine 202. At which point communicator engine 202 can send the street address (that has now been validated), and the received enhanced 911 address identifier and determined expiration date to a security function device for persistence to associated databases and one or more data storage farms (e.g., such as a data storage cloud persistence means). Additionally, as a function of, based on, or in response to receiving the acknowledgement forwarded from provisioning server device 106, communicator engine 202 can permit portable device 104 to be employed as a communication device to communicate with a multiplicity of devices connected to the multicarrier wired and/or wireless communication network.

Where, however, emergency routing device 108, after checking for the validity of the street address against a master street address guide (MSAG) and determining that the submitted street address cannot be correlated with a valid geocode, can return a notification or a negative acknowledgment (NACK) to provisioning server device 106 that emergency routing device 108 was unable to validate the street address. On receiving such a negative acknowledgement from emergency routing device 108, provisioning server device 106 can send the negative acknowledgement to communicator engine 202. Communicator engine 202 as a function of receiving this negative acknowledgement can display an error message on a display device associated with portable device 104 and request that the user enter another (correct) street address for validation, as described above. Communicator engine 202 based on, or as a function of, the negative acknowledgement, also prevents portable device 104 from being utilized to communicate with the multiplicity of devices connected to the multicarrier wired and/or wireless communication network.

Other functionalities carried out by communicator engine 202 can include periodically verifying expiration dates associated with enhanced 911 address identifiers and affiliated to current locations and/or previously validated locations, that have been persisted to memory 204 and/or storage 208. Where communicator engine 202 determines that expiration date is about to expire (e.g., is within a defined period of lapsing, such as two hours, four hours, ten hours, fourteen hours, thirty six hours, etc.), it can send the street address to provisioning server device 106 for processing as described above.

Figure 3:
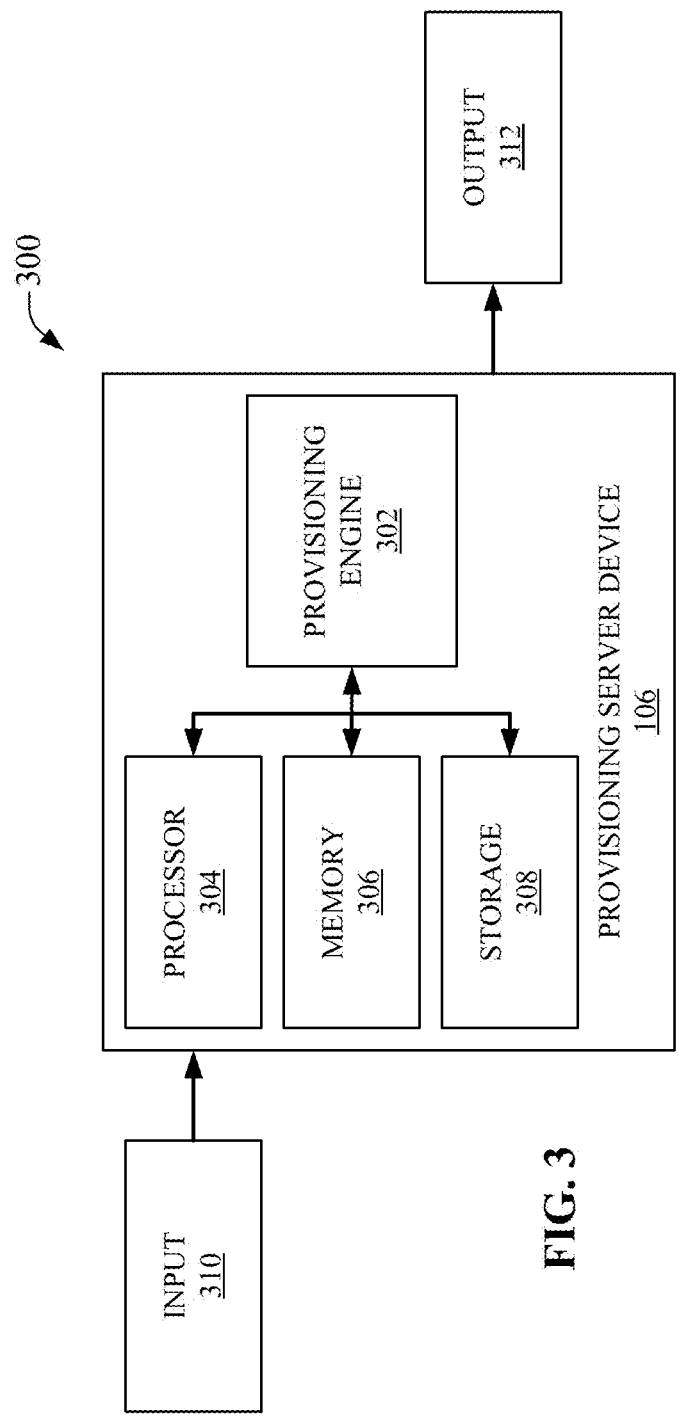
FIG. 3 illustrates a further system for reducing the quantum of periodic payments disbursed to entities tasked with routing telephonic calls for purposes of emergency response in relation to the provision of enhanced 911 services in accordance with aspects of the subject disclosure.

FIG. 3 provides illustration 300 of provisioning server device 106 in accordance with embodiments described in the subject disclosure. As illustrated provisioning server device 106 can include provisioning engine 302, that can be coupled to processor 304, memory 306, and storage 308. Provisioning engine 302 can be in communication with processor 304 for facilitating operation of computer executable instructions and components by provisioning engine 302, memory 306 for storing data and/or the computer executable instructions and components, and storage 308 for providing longer-term storage of data and/or computer executable instructions. Additionally, provisioning server device 106 can also receive input 310 for use, manipulation, and/or transformation by provisioning engine 302 to produce one or more useful, concrete, and tangible result and/or transform one or more article to different states or things. Further, provisioning server device 106 can also generate and output the useful, concrete, and tangible result and/or the transformed one or more articles produced by provisioning engine 302 as output 312.

Provisioning engine 302 can receive a street address validation request from communicator engine 202 operational and/or executing on portable device 104. Provisioning engine 302 in response to receiving the street address validation request, checks its own associated databases and/or data stores (e.g., memory 306 and/or storage 308) to determine whether or not the street address included in the street address validation request from communicator engine 202 appears in the associated databases and/or data stores. In instances where provisioning engine 302 identifies the submitted street address in its associated storage facilities, it can update the expiration date and return the associated enhanced 911 address identifier and the updated expiration date to the communicator engine 202 operating on portable device 104. In order to provide an updated expiration date provisioning engine 302, as described above, employs the current date and adds a defined periodicity to the current date, such as: "current date+23 hours"; "current date+5 days"; "current date+28 days"; or "current date+180 days", wherein "23 hours", "5 days", "28 days", "180 days" can be the defined periodicity.

In instances where provisioning engine 302 is unable to locate, in associated databases and/or data stores, the street address included in the street address validation request received from communicator engine 202, provisioning engine 302 can generate an enhanced 911 address identifier, and include this generated enhanced 911 address identifier in a validation request that can be sent to emergency routing device 108.

Emergency routing device 108, in response to the validation request received from provisioning engine 302, as outlined above, can check the validity of the street address associated with the enhanced 911 address identifier and included in the validation request. Where emergency routing device 108 is able to correlate the submitted street address with a relevant geocode based on, or as a function of, the master street address guide, emergency routing device 108 can associate the identified geocode with the submitted street address and the enhanced 911 address identifier, store the street address, geolocation code, enhanced 911 address identifier, and/or proximate public safety answering point to one or more data storage devices or databases associated with emergency routing device 108, and thereafter can return notification or acknowledgment (ACK) to provisioning engine 302 operational on provisioning server device 106 that emergency routing device 108 was able to validate the street address, correlate the street address with a relevant and recognized geolocation code, and persist the resulting record as an entry in its databases or data storage devices.

Upon receipt of the notification or acknowledgement from emergency routing device 108, provisioning engine 302 can store the user provided street address (e.g., the street address that was originally submitted by the communicator engine 202 executing on portable device 104) as a validated current street location/address to its databases and data storage devices, associate the previously generated enhanced 911 address identifier (and the determined expiration date) with the validated current location/address, and send the generated enhanced 911 address identifier and the determined expiration date to communicator engine 202 operating on portable device 104.

In instances where emergency routing device 108 is incapable of interrelating the submitted street address with a relevant geocode based on, or as a function of, the master street address guide, emergency routing device 108 can send a negative acknowledgement or notification to provisioning engine 302 operational on provisioning server device 106, whereupon based in the negative response received from emergency routing device 108 provisioning engine 302 can forward the negative acknowledgement to the communicator engine 202, at which point communicator engine can facilitate display of an error message on a display device associated with portable device 104 and prompt a user of portable device 104 to enter another (correct) street address.

To facilitate the foregoing, provisioning engine 302 can be in continuous and/or intermittent communication with communicator engine 202 operating on portable device 104, as well as a routing engine 402 executing on emergency routing device 108. Provisioning engine 302, in an embodiment, can be configured to receive a street address validation request from a communicator engine 202 resident and executing on portable device 104 and generate a unique enhanced 911 address identifier (E911AID), wherein the unique E911AID is generated as a function of the street address contained or included in the street address validation request received from the portable device 104 and initiated by communicator engine 202. Provisioning engine 302, based at least in part on, in response to, and/or as a function of the received street address validation request comprising at least the current street address, can also send a query to a routing engine 402 associated with an emergency routing device 108 for validation of the submitted street address; create, associate, and maintain an expiration date for the E911AID; store the validated E911AID/street address pairs in an associated database or data store; and thereafter send/return the validated E911AID/street address couplet/pair data to the communicator engine 202 operational or executing on portable device 104 that initiated the street address validation request.

Additionally, provisioning engine 302, in response to an indication from the a routing engine 402 operational and associated with emergency routing device 108 that a street address included in a submitted or forwarded street address validation request received earlier from the portable device 104 has not been validated or is unverifiable, can return an indication or notification to the communicator engine 202 that the street address contained the previously sent validation request has not been validated or cannot be verified by the routing engine 402 associated with emergency routing device 108, and that a valid street address needs to be reentered by the user into interfaces associated with portable device 104 and controlled by communicator engine 202. It should be noted that until the foregoing street address validation sequence has concluded or has been resolved successfully with a valid and/or verified street address and an associated enhanced 911 address identifier with an expiration date being sent to communicator engine 202, communicator engine 202 operational on portable device 104 can, except for emergency situations (e.g., dialing an emergency response telephone number), prevent the portable device 104 from being used to contact any other non-emergency related wired and/or wireless devices (e.g., mobile devices (e.g., mobile device 102) other than the mobile device to which it is tied based on the mobile device's unique subscriber number or public user identifier, and/or portable devices (e.g., portable device 104) other than itself) extant on any multicarrier wired and/or wireless network.

Additional functionalities and/or facilities that can be performed by provisioning engine 302 can include, based on, in response to, and/or as a function of receiving, from a communicator engine 202 associated with portable device 104, a street address validation request that includes a current street address entered into the communicator engine 202, determining or checking whether or not the entered current street address included in the street address validation request has already been stored to data stores and/or databases associated with provisioning server device 106 (e.g., memory 306 and/or storage 308). In response to, based on, and/or as a function of, determining that the street address appears in the data stores and/or databases associated with provisioning server device 106, provisioning engine 302 can update an expiration date that is typically associated with the current street address, and then can return the current street address together with the expiration date (e.g., in the form of a enhanced 911 address identifier (E911AID)) to communicator engine 202 operational and executing on portable device 104.

Conversely, in response to, based on, and/or as a function of provisioning engine 302 not being able to find, locate, or identify, in databases or data stores associated with provisioning server device 106 (e.g., memory 306 and/or storage 308), the street address included in the street address validation request received from communicator engine 202 operational or executing on a portable device 104, provisioning engine 302 can generate an enhanced 911 address identifier (E911AID) which then can be utilized by provisioning server device 106 to communicate with and to send, as output 312, a validation request (including the generated enhanced 911 address identifier) to a routing engine 402 associated with emergency routing device 108.

In response to the validation request sent to emergency routing device 108, provisioning engine 302 can receive, as input 310, notification that emergency routing device 108 was able to assign a geocode (e.g., provide geo-location coordinates) to the street address associated with or included in the enhanced 911 address identifier, and that the emergency routing device 108 was able to store the enhanced 911 address identifier to one or more databases or data stores associated with emergency routing device 108. In response to receiving notification that emergency routing device 108 was able to assign a geocode and was also able to store the enhanced 911 address identifier, provisioning engine 302 can store the street address, the enhanced 911 address identifier (and generated expiration date) to databases associated with provisioning server device 106, and can thereafter send, as output 312, the enhanced 911 address identifier (and the expiration date) to communicator engine 202 associated with portable device 104.

In instances where emergency routing device 108 is unable to assign a valid geocode to the street address associated with and included in the enhanced 911 address identifier, provisioning engine 302 can receive, via input 310, notification that emergency routing device 108 was unable to assign a valid geocode. On receipt of this notification, provisioning engine 302 can send the failure response to communicator engine 202 associated with and operational on portable device 104. At this point, as has be described above, communicator engine 202 associated with portable device 104 can facilitate display of an error message to the user, and can facilitate the user in entering another (correct) street address that can on appropriated validation as has been outlined above can be utilized as a current address/location of the portable device 104.

Other functionalities and facilities provided by provisioning engine 302 can include, on a periodic basis (e.g., daily), scanning databases or data stores associated with provisioning server device 106 for expired enhanced 911 address identifiers. Subsequent to the scanning, in response to provisioning engine 302 identifying expired/obsolete enhanced 911 address identifiers, provisioning engine 302 can communicate with emergency routing device 108 (and routing engine 402), via output 312, to ensure that these obsolete records are removed from the databases and/or data stores associated with the emergency routing device 108. Once emergency routing device 108 has completed deletion or removal from its databases and/or associated data stores of obsolete and expired enhanced 911 address identifiers, provisioning engine 302 can receive, as input 310, confirmation from the emergency routing device 108, at which point provisioning engine 302 can remove street address entries associated with expired and/or obsolete enhanced 911 address identifiers from its associated databases and/or affiliated data stores (e.g., memory 306 and/or storage 308).

Further activities that can be carried out by provisioning engine 302 can also include on a periodic basis (e.g., daily) receiving, from communicator engine 202 affiliated with portable device 104, a request for the renewal or extension the expiration date associated with the enhanced 911 address identifier and ae currently valid street address. The request for renewal or extension of the expiration date can be initiated, by the communicator engine 202 associated with portable device 104, when the communicator engine 202 determines that the expiration date associated with a hitherto and currently valid street address and the enhanced 911 address identifier will immanently lapse within a defined or definable period of time. The communicator engine 202 on portable device 104 in response to determining that the expiration date is about to elapse, can send a request to provisioning server device 106 (and provisioning engine 302) to have provisioning engine 302 perform one or more acts described above to extend the expiration period.

Figure 4:
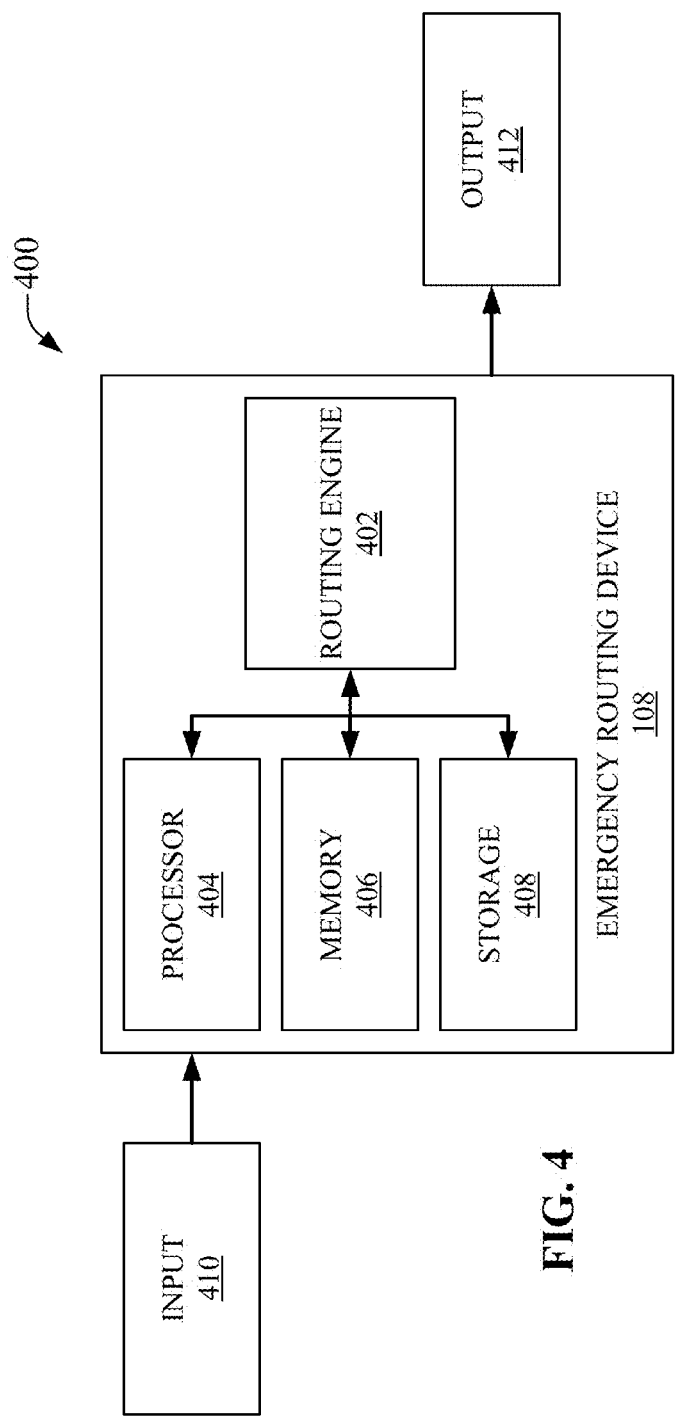
FIG. 4 is still yet a further illustration of a system for reducing the quantum of periodic payments disbursed to entities tasked with routing telephonic calls for purposes of emergency response in relation to the provision of enhanced 911 services in accordance with aspects of the subject disclosure.

FIG. 4 provides illustration 400 of emergency routing device 108 in accordance with various embodiments described in the subject disclosure. As depicted, emergency routing device 108 can be an implementation governed by regulatory requirement and can include routing engine 402, that can be coupled to processor 404, memory 406, and storage 408. Routing engine 402 can be in communication with processor 404 for facilitating operation of computer executable instructions and components by routing engine 402, memory 406 for storing data and/or the computer executable instructions and components, and storage 408 for providing longer-term storage of data and/or computer executable instructions. Additionally, emergency routing device 108 can also receive input 410 for use, manipulation, and/or transformation by routing engine 402 to produce one or more useful, concrete, and tangible result and/or transform one or more article to different states or things. Further, emergency routing device 108 can also generate and output the useful, concrete, and tangible result and/or the transformed one or more articles produced by routing engine 402 as output 412.

Routing engine 402, via input 410 and output 412, can be in constant, continuous, intermittent, and/or sporadic communication with provisioning engine 302 as well as with the wider public switched telephone network and its radio access network extensions. Routing engine 402, again via input 410 and output 412, can also be in constant, continuous, intermittent, and/or sporadic communication with a multiplicity various public safety answering points through which public safety response resources can be allocated and dispatched when various emergency situations arise. Routing engine 401, when a call for public safety response resources is initiated by a user through the public switched telephone network and/or by functionalities and/or facilities provided by an associated radio access network, can route the call to a public safety answering point in close proximity to the location from where the call was or is being initiated.

Routing engine 402 can receive validation requests (inclusive of street address and generated and associated enhanced 911 address identifier) from provisioning engine 302 operating on provisioning server device 106. On receipt of a validation request from provisioning engine 302, routing engine 402 checks databases and/or data storage units (e.g., memory 404 and/or storage 408) associated with emergency routing device 108 to determine whether or not a street address included in the received validation request appears in a master street address guide (MSAG). When routing engine 402 determines that the submitted street address cannot be correlated, paired, or associated with geolocation coordinates included in the master street address guide, can return notifications to provisioning engine 302 operating on provisioning server device 106 that the submitted street address is invalid, unverifiable, or cannot be verified. Provisioning engine 302 in turn forwards these invalidity notifications to portable device 104 for further processing by communicator engine 202 associated with portable device 104.

Where routing engine 402 identifies geolocation coordinates that can be associated with the submitted street address and/or determines that the geolocation coordinates can be manually entered, routing engine 402 can store the enhanced 911 address identifier and the submitted street address to databases and/or data storage facilities associated with emergency routing device 108, and subsequent to, or contemporaneously with, the storage operation performed by routing engine 402, routing engine 402 can send a notification message to provisioning engine 302 operating on provisional server device 106 confirming the fact that the submitted street address has been validated with appropriate geolocation coordinates, and that the validated street address in association with the determined geolocation coordinates, and the enhanced 911 address identifier has been stored to databases or data storage facilities associated with emergency routing device 108.

Additional functionalities that can be performed by routing engine 402, can include periodically receiving, from provisioning server device 106, requests for the removal of expired entries from the databases associated with emergency routing device 108. As has been detailed earlier, provisioning engine 302 periodically scans databases and/or data storage units associated with provisioning server device 106 for records associated with expired/obsolete enhanced 911 address identifiers and/or street addresses. Provisioning server device 106 can compile and submit a list of such expired and obsolete enhanced 911 address identifiers and/or street addresses to emergency routing device 108 requesting that routing engine 402 remove the expired entries or records from databases and/or data storage facilities affiliated with emergency routing device 108. Once routing engine 402 has completed removal of the expired entries or records included in the list of records submitted by provisioning server device 106, emergency routing device 108 can return to provisioning server device 106 a notification or message confirming that the expired records have been expunged from the databases and/or data storage units controlled and/or maintained by emergency routing device 108. As has been noted above, in response to receiving notification confirming removal of expired records from databases and data storage facilities maintained and controlled by emergency routing device 108, provisioning server device 106 and in particular provisioning engine 302, as a function of the list that was sent to emergency routing device 108, can similarly expunge the expired records from databases and/or storage units controlled and maintained by provisioning server device 106.

Figure 5:
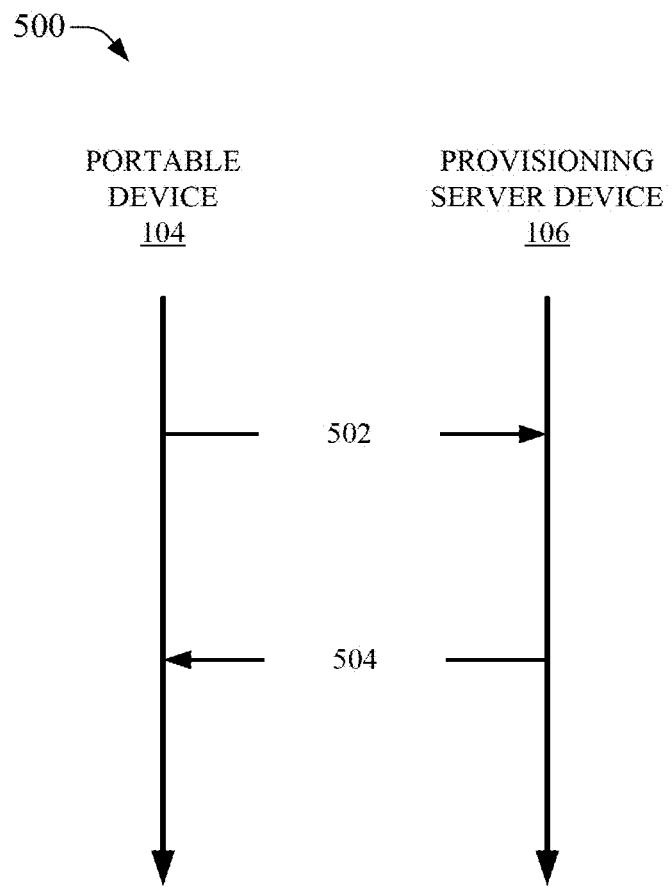
FIG. 5 depicts a communications flow chart for reducing the quantum of periodic payments disbursed to entities tasked with routing telephonic calls for purposes of emergency response in relation to the provision of enhanced 911 services in accordance with aspects of the subject disclosure.

FIG. 5 provides illustration of a communication flow chart 500 in accordance with described embodiments. As illustrated, at act 502, a portable device 104, on determining that an expiration date associated with an enhanced 911 address identifier has lapsed, sends a request to a provisioning server device 106 for further processing. Upon receiving the request from portable device 104, provisioning server device 106 can check its databases to determine whether the street address that was included in the request from portable device 104 appears in databases associated with provisioning server device 106. Where provision server device 106 determines that the street address appears in its associated databases, provisioning server device 106, updates an expiration date associated with the street address, associates the expiration date, street address, and a generated enhanced 911 address identifier, and returns the expiration date, street address, and the generated enhanced 911 address identifier to portable device 104, at 504. Portable device 104, on receiving the response from provisioning server device 106, allows users associated with portable device 104 to establish and receive communication from disparate devices associated with one or more multicarrier wired and/or wireless networks.

Figure 6:
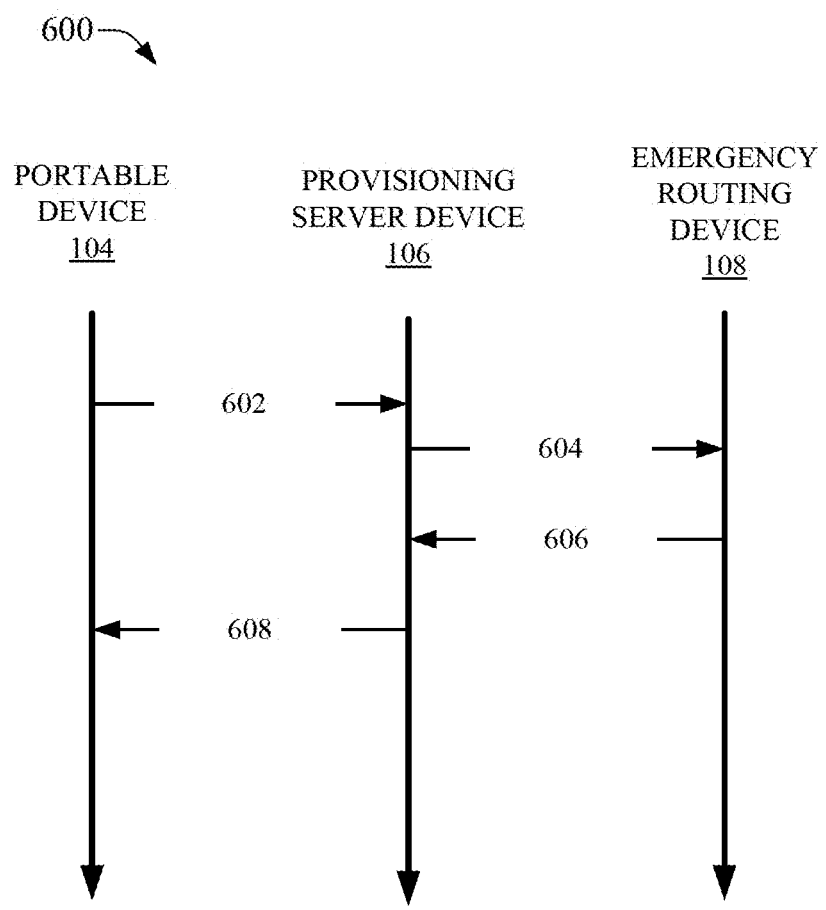
FIG. 6 provides illustration of a further communications flow chart for reducing the quantum of periodic payments disbursed to entities tasked with routing telephonic calls for purposes of emergency response in relation to the provision of enhanced 911 services in accordance with aspects of the subject disclosure.

FIG. 6 provides illustration of a communication flow chart 600 in accordance with one or more described embodiment. As illustrated, at act 602, a portable device 104, on determining that a user has entered a new address to be identified as a current location, sends a request to a provisioning server device 106 for further processing. Provisioning server device 106 on receiving the request at 602 determines whether or not the street address included in the request appears in one or more of its associated databases. If provisioning server device 106 identifies the street address in its databases, provisioning server device 106, since from the perspective of provisioning server device 106 the submitted street address is not new as it already appears in its databases, can, at 608, return to portable device 104 the expiration date associated with the submitted street address and, since the submitted street address is already known to provisioning server device 106, a previously generated and associated enhanced 911 address identifier. If on the other hand provisioning server device 106 is unable to locate the street address in its databases (e.g., the submitted street address has not previously been received by provisioning server device 106), provisioning server device 106 can generate an enhanced 911 address identifier as a function of the new street address submitted in the request received from portable device 104 at 602 and can include the newly generated enhanced 911 address identifier in a validation request sent to emergency routing device 108 at 604.

Emergency routing device 108 on receiving checks the validity of the street address against a master street address guide associated with emergency routing device 108 to determine whether the submitted street address can be machine geocoded (e.g., provided geographically relevant locations codes), manually geocoded, and/or manually corrected, wherein emergency routing device 108 is capable of supplying a geolocation code to the street address, emergency routing device 108 can send notification reflective of this fact to provisioning server device 106 at 606.

Provisioning server device 106 having received a positive notification from emergency routing device 108 at 606 can store the new street address, the generated enhanced 911 address identifier and an expiration date to data storage devices, and thereafter can, at 608, send the enhanced 911 address identifier and its associated expiration date to portable device 104, whereupon portable device 104 on receiving the enhanced 911 address identifier and its associated expiration date can permit users associated with portable device 104 to establish and receive communication from devices associated with multicarrier wired and/or wireless networks.

Figure 7:
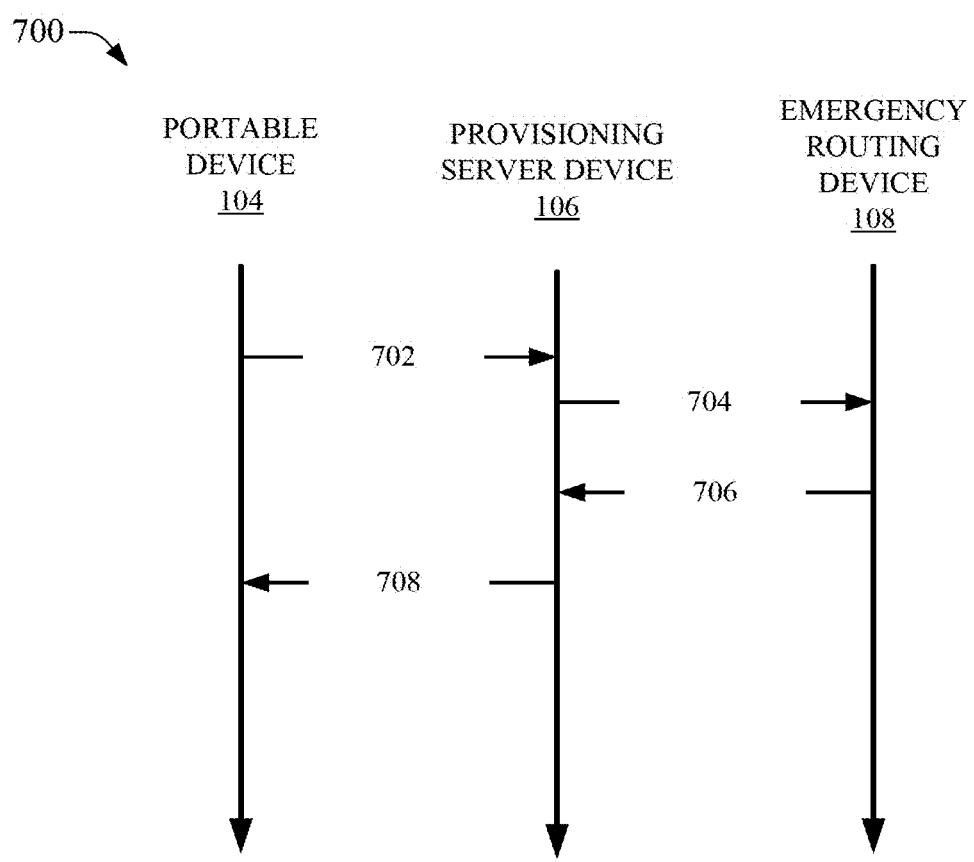
FIG. 7 provides another illustration of a communications flow chart for reducing the quantum of periodic payments disbursed to entities tasked with routing telephonic calls for purposes of emergency response in relation to the provision of enhanced 911 services in accordance with aspects of the subject disclosure.

FIG. 7 provides depiction of another communication flow chart 700 in accordance with various described embodiments. As illustrated, at 702, a portable device 104, having determined either that a user has entered a new address to be identified as a current location or that an expiration date associated with a previously received enhanced 911 address identifier has lapsed, sends a request to a provisioning server device 106 for further processing. Provisioning server device 106, as a function of receiving the request and the street address included in the request can check its databases and/or data stores to ascertain if the street address is already in these databases and/or data stores. If the street address does not appear in the databases and/or data stores associated with provisioning server device 106, provisioning server device 106 sends, at 704, a validation request to emergency routing device 108. Based on receipt of the validation request from provisioning server device 106 and a determination by emergency routing device 108 that the street address included in the validation request does not appear in a master street address guide (MSAG) database and as such cannot be assigned or allocated a geographic location code, emergency routing device 108 can return a negative notification reflective of this reality to provisioning server device 106 at 706.

Provisioning server device 106, on receiving the negative notification from emergency routing device 108, can forward the failure response to portable device 104 at 708, whereupon the portable device 104 can display an error message on a display device associated with portable device 104 and prompt the user to enter another (correct) street address.

In view of the example system(s) described above, example method(s) that can be implemented in accordance with the disclosed subject matter can be better appreciated with reference to flowcharts in FIGS. 8-11. For purposes of simplicity of explanation, example methods disclosed herein are presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 8:
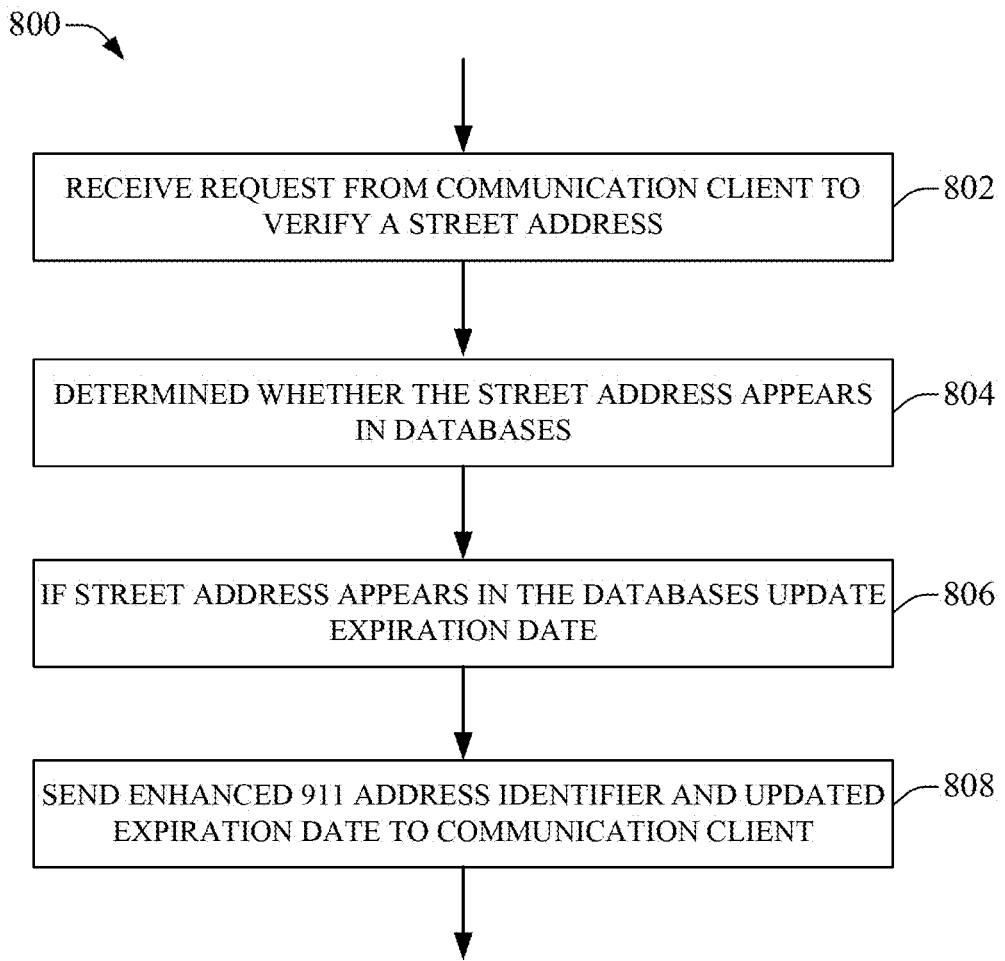
FIG. 8 illustrates a method for reducing the quantum of periodic payments disbursed to entities tasked with routing telephonic calls for purposes of emergency response in relation to the provision of enhanced 911 services in accordance with aspects of the subject disclosure.

FIG. 8 illustrates a method 800 for reducing the quantum of periodic payments disbursed to entities tasked with routing telephonic calls for purposes of emergency response in relation to the provision of enhanced 911 services in accordance with an embodiment. Method 800 can commence at 802 where a provisioning server device 106 can receive a request, from a communication client operational on a portable device 104, to verify a street address. In response to receiving the request at 802, the provisioning server device 106 can determine whether the street address appears in one or more associated databases or data storage means associated with provisioning server device 106 at 804. Where provisioning server device 106 is able to locate the street address in databases or data storage means associated with provisioning server device 106, provisioning server device 106 can, at 806, update an expiration date associated with the street address and it enhanced 911 address identifier and thereafter, at 808, provisioning server device 106 can return the enhanced 911 address identifier and the updated expiration date to the originating communication client executing on portable device 104.

Figure 9:
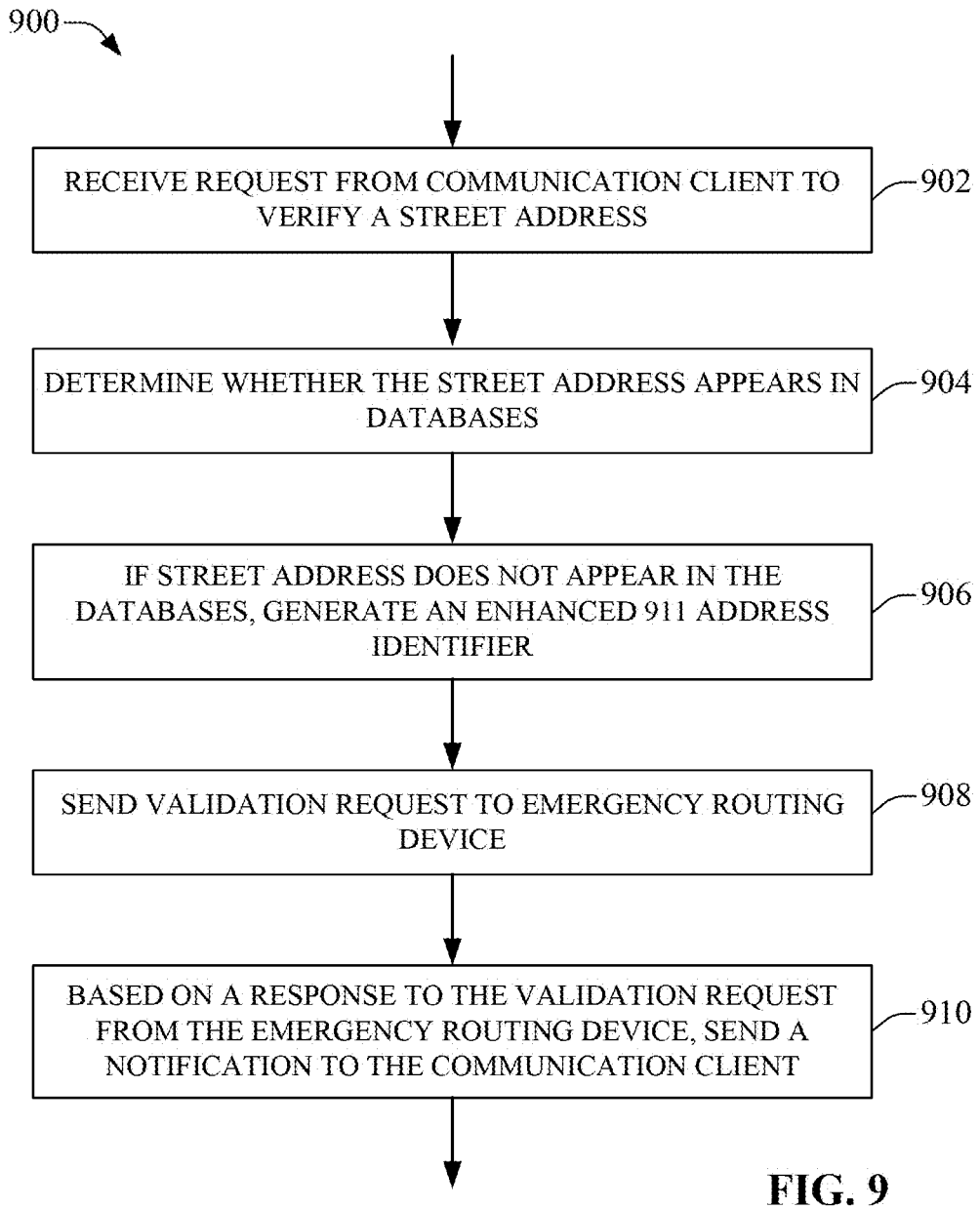
FIG. 9 illustrates a further method for reducing the quantum of periodic payments disbursed to entities tasked with routing telephonic calls for purposes of emergency response in relation to the provision of enhanced 911 services in accordance with aspects of the subject disclosure.

FIG. 9 illustrates a further method 900 for reducing the quantum of periodic payments disbursed to entities tasked with routing telephonic calls for purposes of emergency response in relation to the provision of enhanced 911 services in accordance with an embodiment. Method 900 can commence at 902 where a provisioning server device 106 can receive a request to verify a street address, from a communication client operational on a portable device 104. At 904 provisioning server device 106 can determine whether or not the street address that can have been included in the verification request received from the communication client has been included in one or more data storage devices and/or databases associated with provisioning server device 106. Where provisioning server device 106 is unable to identify the submitted street address within its databases and/or storage devices, provisioning server device 106, at 906 can generate an enhanced 911 address identifier and, at 908, send a verification request that includes the street address and the enhanced 911 address identifier to emergency routing device 108 and thereafter await a response from the emergency routing device 108. At 910, in response to, and based on the reply received from emergency routing device 108, provisioning server device 106 sends a notification to the initiating communication client executing on portable device 104.

Figure 10:
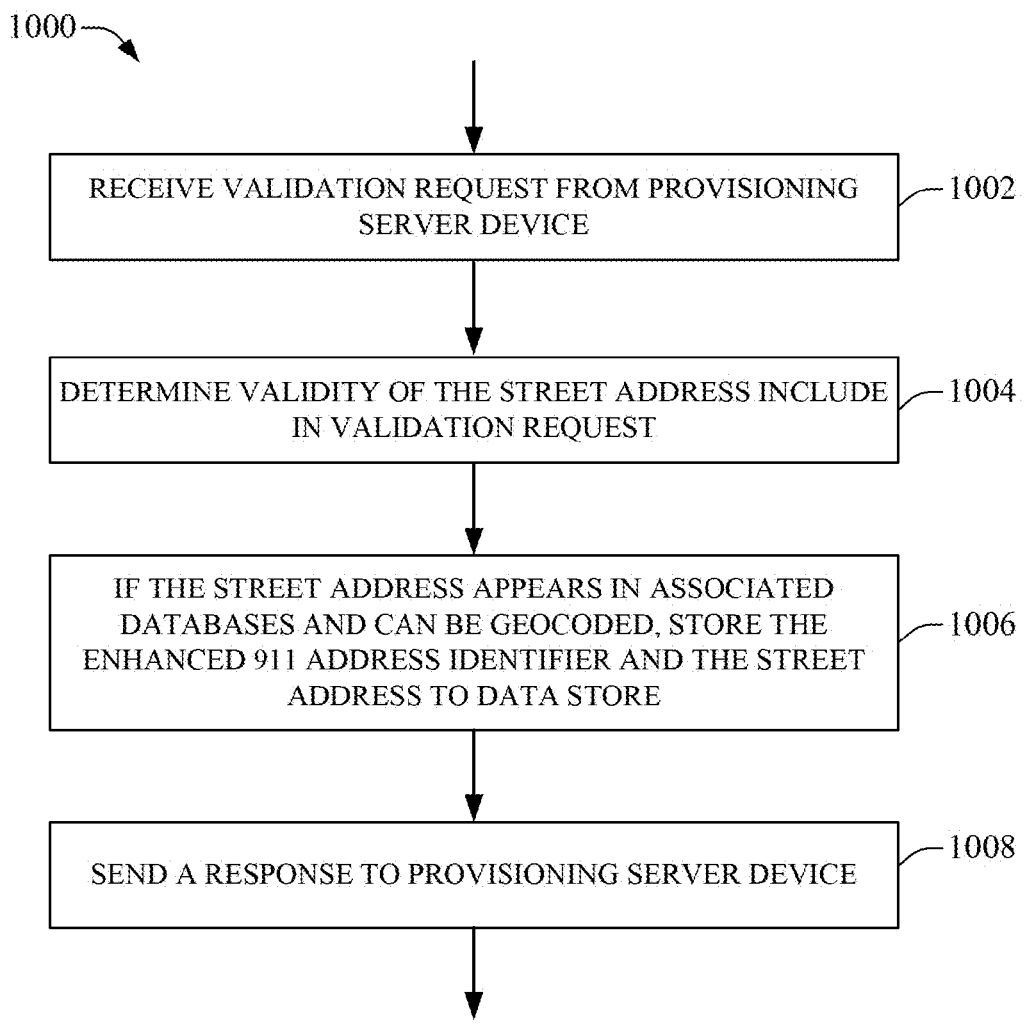
FIG. 10 illustrates another method for reducing the quantum of periodic payments disbursed to entities tasked with routing telephonic calls for purposes of emergency response in relation to the provision of enhanced 911 services in accordance with aspects of the subject disclosure.

FIG. 10 illustrates another method 1000 for reducing the quantum of periodic payments disbursed to entities tasked with routing telephonic calls for purposes of emergency response in relation to the provision of enhanced 911 services in accordance with an embodiment. Method 1000 can commence at 1002 where emergency routing device 108 can receive a validation request from provisioning server device 106. On receiving the validation request from provisioning server device 106, emergency routing device 108, at 1004, can determine the validity of the street address included in the validation request by accessing one or more databases and/or data storage facilities or devices to determine whether the street address included in the validation request finds entry in a master street address guide persisted to the one or more databases and/or data storage facilities associated with emergency routing device 108. At 1006, if emergency routing device 108 locates the submitted street address in the master street address guide persisted to one or more databases and/or data storage facilities associated with the emergency routing device 108, the enhanced 911 address identifier generated by provisioning server device 106 and the street address included in the validation request can be stored to the one or more databases associated with emergency routing device 108. At 1008, once emergency routing device 108 has stored the record that includes at least the street address and a geolocation code ascertained from the lookup of the master street address guide and the enhanced 911 address identifier, to the one or databases and/or data storage facilities affiliated with emergency routing device 108, emergency routing device 108 can send a positive response to provisioning server device 106 notifying provisioning server device 106 that emergency routing device 108 has completed processing based on the received validation request and that the street address included and submitted in the received validation request is valid.

Figure 11:
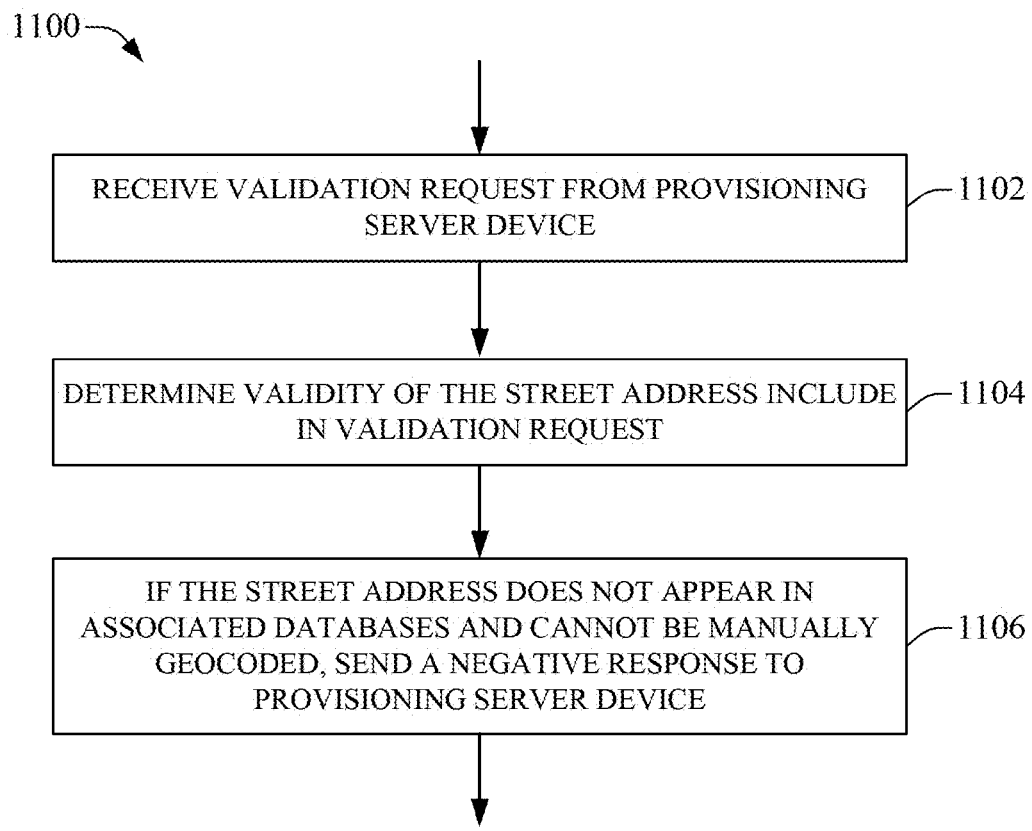
FIG. 11 illustrates a still further method for reducing the quantum of periodic payments disbursed to entities tasked with routing telephonic calls for purposes of emergency response in relation to the provision of enhanced 911 services in accordance with aspects of the subject disclosure.

FIG. 11 depicts an additional method 1100 for reducing the quantum of periodic payments disbursed to entities tasked with routing telephonic calls for purposes of emergency response in relation to the provision of enhanced 911 services in accordance with an embodiment. Method 1100 can commence at 1102 where emergency routing device 108 can receive a validation request from provisioning server device 106. On receiving the validation request from provisioning server device 106, emergency routing device 108, at 1104, can determine the validity of the street address included in the validation request by accessing one or more databases and/or data storage facilities or devices to determine whether the street address included in the validation request finds entry in a master street address guide persisted to the one or more databases and/or data storage facilities associated with emergency routing device 108. Where emergency routing device 108, at 1104, is unable to find entry of the submitted street address in the master street address guide persisted to one or more databases and/or data storage facilities associated with the emergency routing device 108 and/or emergency routing device 108 determines that geographical coordinates cannot be correlated with the submitted street address, emergency routing device 108, at 1106, can return a negative response to provisioning server device 106, notifying provisioning server device 106 that the street address submitted in the received validation request is invalid.

Figure 12:
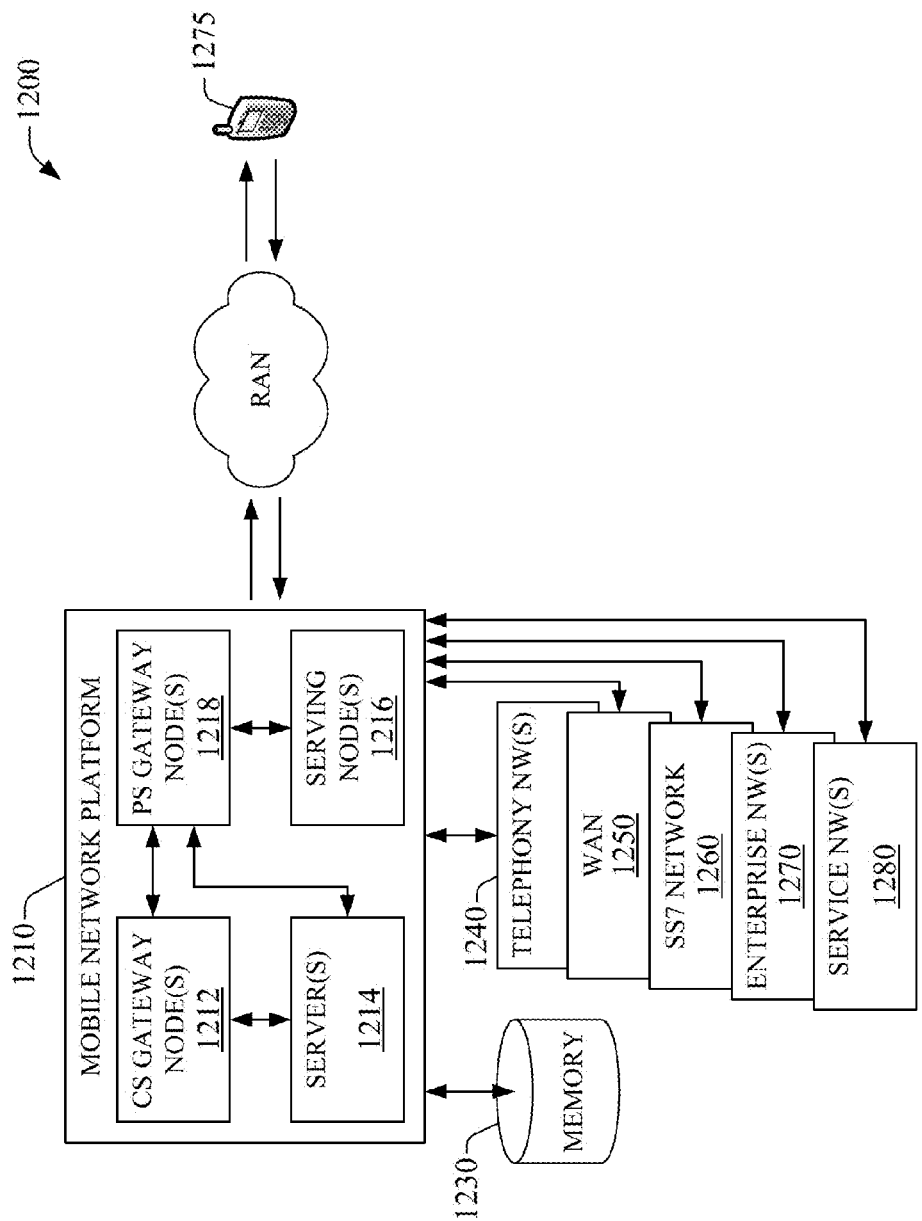
FIG. 12 is a block diagram of an example embodiment of a mobile network platform to implement and exploit various features or aspects of the subject disclosure.

FIG. 12 presents an example embodiment 1200 of a mobile network platform 1210 that can implement and exploit one or more aspects of the disclosed subject matter described herein. Generally, wireless network platform 1210 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1210 can be included in telecommunications carrier networks, and can be considered carrier-side components as discussed elsewhere herein. Mobile network platform 1210 includes CS gateway node(s) 1212 which can interface CS traffic received from legacy networks like telephony network(s) 1240 (e.g., public switched telephone network (PSTN), or public land mobile network (PLMN)) or a signaling system #7 (SS7) network 1270. Circuit switched gateway node(s) 1212 can authorize and authenticate traffic (e.g., voice) arising from such networks. Additionally, CS gateway node(s) 1212 can access mobility, or roaming, data generated through SS7 network 1270; for instance, mobility data stored in a visited location register (VLR), which can reside in memory 1230. Moreover, CS gateway node(s) 1212 interfaces CS-based traffic and signaling and PS gateway node(s) 1218. As an example, in a 3GPP UMTS network, CS gateway node(s) 1212 can be realized at least in part in gateway GPRS support node(s) (GGSN). It should be appreciated that functionality and specific operation of CS gateway node(s) 1212, PS gateway node(s) 1218, and serving node(s) 1216, is provided and dictated by radio technology(ies) utilized by mobile network platform 1210 for telecommunication.

In addition to receiving and processing CS-switched traffic and signaling, PS gateway node(s) 1218 can authorize and authenticate PS-based data sessions with served mobile devices. Data sessions can include traffic, or content(s), exchanged with networks external to the wireless network platform 1210, like wide area network(s) (WANs) 1250, enterprise network(s) 1270, and service network(s) 1280, which can be embodied in local area network(s) (LANs), can also be interfaced with mobile network platform 1210 through PS gateway node(s) 1218. It is to be noted that WANs 1250 and enterprise network(s) 1260 can embody, at least in part, a service network(s) like IP multimedia subsystem (IMS). Based on radio technology layer(s) available in technology resource(s), packet-switched gateway node(s) 1218 can generate packet data protocol contexts when a data session is established; other data structures that facilitate routing of packetized data also can be generated. To that end, in an aspect, PS gateway node(s) 1218 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1200, wireless network platform 1210 also includes serving node(s) 1216 that, based upon available radio technology layer(s) within technology resource(s), convey the various packetized flows of data streams received through PS gateway node(s) 1218. It is to be noted that for technology resource(s) that rely primarily on CS communication, server node(s) can deliver traffic without reliance on PS gateway node(s) 1218; for example, server node(s) can embody at least in part a mobile switching center. As an example, in a 3GPP UMTS network, serving node(s) 1216 can be embodied in serving GPRS support node(s) (SGSN).

For radio technologies that exploit packetized communication, server(s) 1214 in wireless network platform 1210 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1210. Data streams (e.g., content(s) that are part of a voice call or data session) can be conveyed to PS gateway node(s) 1218 for authorization/authentication and initiation of a data session, and to serving node(s) 1216 for communication thereafter. In addition to application server, server(s) 1214 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1210 to ensure network's operation and data integrity in addition to authorization and authentication procedures that CS gateway node(s) 1212 and PS gateway node(s) 1218 can enact. Moreover, provisioning server(s) can provision services from external network(s) like networks operated by a disparate service provider; for instance, WAN 1250 or Global Positioning System (GPS) network(s) (not shown). Provisioning server(s) can also provision coverage through networks associated to wireless network platform 1210 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1275.

It is to be noted that server(s) 1214 can include one or more processors configured to confer at least in part the functionality of macro network platform 1210. To that end, the one or more processor can execute code instructions stored in memory 1230, for example.

In example embodiment 1200, memory 1230 can store information related to operation of wireless network platform 1210. Other operational information can include provisioning information of mobile devices served through wireless platform network 1210, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1230 can also store information from at least one of telephony network(s) 1240, WAN 1250, enterprise network(s) 1260, or SS7 network 1270. In an aspect, memory 1230 can be, for example, accessed as part of a data store component or as a remotely connected memory store.

Figure 13:
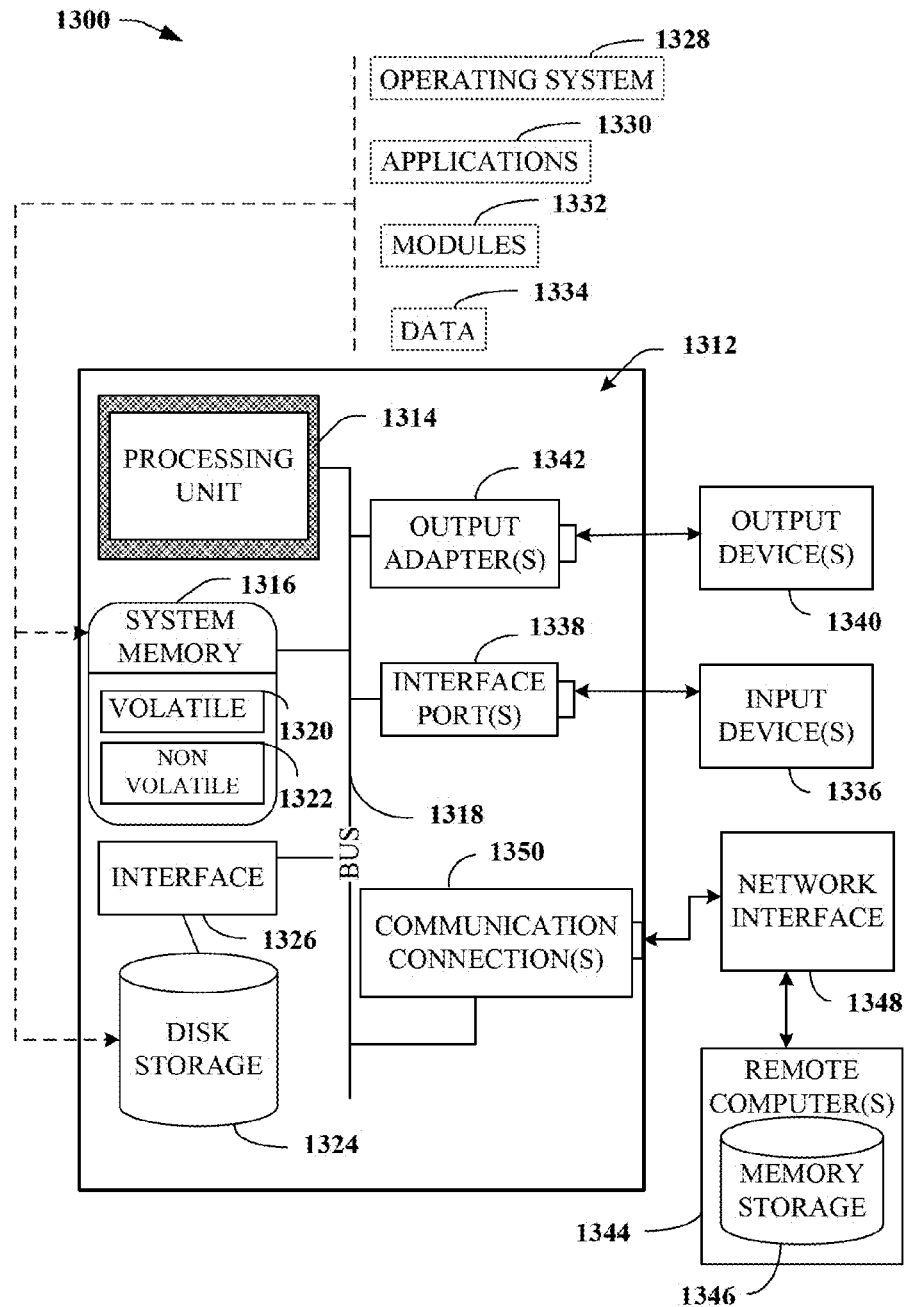
FIG. 13 illustrates a block diagram of a computing system operable to execute the disclosed systems and methods in accordance with an embodiment.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 13 illustrates a block diagram of a computing system 1300 operable to execute the disclosed systems and methods in accordance with an embodiment. Computer 1312, which can be, for example, part of the hardware of system 100, includes a processing unit 1314, a system memory 1316, and a system bus 1318. System bus 1318 couples system components including, but not limited to, system memory 1316 to processing unit 1314. Processing unit 1314 can be any of various available processors. Dual microprocessors and other multiprocessor architectures also can be employed as processing unit 1314.

System bus 1318 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1316 can include volatile memory 1320 and nonvolatile memory 1322. A basic input/output system (BIOS), containing routines to transfer information between elements within computer 1312, such as during start-up, can be stored in nonvolatile memory 1322. By way of illustration, and not limitation, nonvolatile memory 1322 can include ROM, PROM, EPROM, EEPROM, or flash memory. Volatile memory 1320 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1312 can also include removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to system bus 1318, a removable or non-removable interface is typically used, such as interface 1326.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 13 describes software that acts as an intermediary between users and computer resources described in suitable operating environment 1300. Such software includes an operating system 1328. Operating system 1328, which can be stored on disk storage 1324, acts to control and allocate resources of computer system 1312. System applications 1330 take advantage of the management of resources by operating system 1328 through program modules 1332 and program data 1334 stored either in system memory 1316 or on disk storage 1324. It is to be noted that the disclosed subject matter can be implemented with various operating systems or combinations of operating systems.

A user can enter commands or information into computer 1312 through input device(s) 1336. As an example, mobile device 102 and/or portable device 104 can include a user interface embodied in a touch sensitive display panel allowing a user to interact with computer 1312. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1314 through system bus 1318 by way of interface port(s) 1338. Interface port(s) 1338 include, for example, a serial port, a parallel port, a game port, a universal serial bus (USB), an infrared port, a Bluetooth port, an IP port, or a logical port associated with a wireless service, etc. Output device(s) 1340 use some of the same type of ports as input device(s) 1336.

Thus, for example, a USB port can be used to provide input to computer 1312 and to output information from computer 1312 to an output device 1340. Output adapter 1342 is provided to illustrate that there are some output devices 1340 like monitors, speakers, and printers, among other output devices 1340, which use special adapters. Output adapters 1342 include, by way of illustration and not limitation, video and sound cards that provide means of connection between output device 1340 and system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. Remote computer(s) 1344 can be a personal computer, a server, a router, a network PC, cloud storage, cloud service, a workstation, a microprocessor based appliance, a peer device, or other common network node and the like, and typically includes many or all of the elements described relative to computer 1312.

For purposes of brevity, only a memory storage device 1346 is illustrated with remote computer(s) 1344. Remote computer(s) 1344 is logically connected to computer 1312 through a network interface 1348 and then physically connected by way of communication connection 1350. Network interface 1348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1350 refer(s) to hardware/software employed to connect network interface 1348 to bus 1318. While communication connection 1350 is shown for illustrative clarity inside computer 1312, it can also be external to computer 1312. The hardware/software for connection to network interface 1348 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
   generating an enhanced 911 address identifier as a function of a street address for a current location associated with a user identity;
   determining an expiration date associated with the street address based on the enhanced 911 address identifier;
   in response to determining the expiration date has not expired, designating the street address as an emergency contact location for the user identity; and
   based on the emergency contact location, establishing a communication between the device network device associated with a multicarrier wireless network.

2. The device of claim 1, wherein the operations further comprise, in response to determining that the expiration date has expired, instructing address data representing the street address to be sent to a provisioning server device coupled to a data storage device.

3. The device of claim 1, wherein the input is first input, wherein the operations further comprise, in response to receiving second input representing an updated street address for the current location associated with the user identity, instructing updated address data representing the updated street address to be sent to a provisioning server device coupled to a data storage device, and wherein the updated street address is to replace the street address as the emergency contact location.

4. The device of claim 3, wherein the expiration date is a first expiration date, wherein the enhanced 911 address identifier is a first enhanced 911 address identifier, wherein the operations further comprise receiving validated street address data from the provisioning server device, and wherein the validated street address data comprises a second expiration date determined by the provisioning server device and a second enhanced 911 address identifier generated by the provisioning server device.

5. The device of claim 4, wherein the operations further comprise:
   associating the second expiration date and the second enhanced 911 address identifier with the updated street location; and
   storing the local data to a data storage device.

6. The device of claim 3, wherein the operation further comprise, in response to receiving a negative reply representing an inability to validate the street address from the provisioning server device,
   initiating display of an error message on a display device; and
   requesting third input representing an alternative street address for the current location associated with the user identity.

7. A method, comprising:
   generating, by a system comprising a processor, an enhanced 911 address identifier based on a street address included in a street address validation request;
   as a function of the enhanced 911 address identifier, determining, by the system, that the street address has an entry representing the street address associated with a user identity stored by a data storage device associated with the system;
   as a function of determining that the street address has the entry in the data storage device, updating, by the system, an expiration date associated with the street address; and
   returning, by the system, updated data representing the expiration date and the enhanced 911 address identifier.

8. The method of claim 7, wherein the entry comprises data that correlates the street address with a geographic coordinate.

9. The method of claim 7, wherein the entry comprises the enhanced 911 address identifier and the expiration date associated with the street address.

10. The method of claim 7, wherein the updating comprises adding a defined periodicity to a current date to result in the expiration date associated with the street address.

11. The method of claim 7, wherein the enhanced 911 address identifier is used as an index to search the data storage device.

12. The method of claim 7, further comprising, as a function of determining that the street address does have the entry in the data storage device,
   generating, by the system, the enhanced 911 address identifier; and
   initiating, by the system, sending of verification data representing the enhanced 911 address identifier and the street address to an emergency routing device.

13. The method of claim 12, further comprising, in response to receiving notification data representing a notification from the emergency routing device that the street address included in the verification data cannot be correlated with a geographical coordinate, initiating, by the system, sending of the notification to a portable device to facilitate re-entry of the street address.

14. The method of claim 12, further comprising, in response to receiving notification data representing a notification from the emergency routing device that the street address included in the verification data has been correlated with a geographical coordinate, storing, by the system, storage data representing the enhanced 911 address identifier, the street address, and a determined expiration date to the data storage device as the entry.

15. The method of claim 7, further comprising:
periodically scanning, by the system, the data storage device for entries associated with enhanced 911 address identifiers that have expired as a function of a current date;
initiating, by the system, sending of removal request data representing the entries that have expired to an emergency routing device to facilitate removal of the entries from a data store device associated with the emergency routing device; and
in response to a confirmation data representing a notification that the emergency routing device has removed the entries from the data storage device associated with the emergency routing device, deleting, by the system, the entries from the data storage device as a function of the removal request data.

16. A non-transitory machine-readable storage medium, comprising executable instructions that, when executed by a processor, facilitate performance of operations, comprising:
preventing establishment of a communication to a network device associated with a multicarrier wireless network;
generating an enhanced 911 address identifier as a function of input representing a street address for a current location associated with a user identity;
determining, based on the enhanced 911 address identifier, an expiration date associated with the street address;
designating the street address as an emergency contact location for the user identity in response to determining that the expiration date has not lapsed due to passage of time; and
permitting the establishment of the communication to the network device associated with the multicarrier wireless network.

17. The non-transitory machine-readable storage medium of claim 16, wherein the operations further comprise, in response to determining that the expiration date has lapsed due to the passage of time, initiating sending of address data representing the street address to a provisioning server device coupled to a data storage device.

18. The non-transitory machine-readable storage medium of claim 16, wherein the input is initial input, and the operations further comprise, in response to receiving further input representing an alternate street address for the current location associated with the user identity, initiating sending of alternative address data representing the alternative street address to a provisioning server device coupled to a data storage device, and wherein the alternative street address is to be used as the emergency contact location.

19. The non-transitory machine-readable storage medium of claim 18, wherein the enhanced 911 address identifier is a first enhanced 911 address identifier, wherein the expiration date is a first expiration date, wherein the operations further comprise receiving validated street address data from the provisioning server device, and wherein the validated street address data comprises a second expiration date and a second enhanced 911 address identifier generated by the provisioning server device.

20. The non-transitory machine-readable storage medium of claim 19, wherein the operations further comprise initiating sending of security data representing the street address and the second enhanced 911 address identifier to a security function device coupled to the data storage device.

* * * * *